(12) United States Patent
Lee

(10) Patent No.: US 10,636,234 B2
(45) Date of Patent: Apr. 28, 2020

(54) METHOD FOR LOCK DEVICE CONTROL AND ELECTRONIC DEVICE THEREOF

(71) Applicant: Samsung Electronics Co., Ltd., Suwon-si, Gyeonggi-do (KR)

(72) Inventor: Jayoun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/067,372

(22) PCT Filed: Dec. 19, 2016

(86) PCT No.: PCT/KR2016/014854
§ 371 (c)(1),
(2) Date: Jun. 29, 2018

(87) PCT Pub. No.: WO2017/119631
PCT Pub. Date: Jul. 13, 2017

(65) Prior Publication Data
US 2019/0019365 A1    Jan. 17, 2019

(30) Foreign Application Priority Data
Jan. 5, 2016  (KR) .................. 10-2016-0000970

(51) Int. Cl.
*G07C 9/00*    (2020.01)
*H04W 12/06*   (2009.01)
(Continued)

(52) U.S. Cl.
CPC .......... *G07C 9/00309* (2013.01); *E05B 47/00* (2013.01); *E05B 81/76* (2013.01);
(Continued)

(58) Field of Classification Search
CPC . G07C 9/00309; G07C 9/00571; E05B 47/00; E05B 81/76; H04W 12/06; H04W 12/08; H04W 88/02; H04W 4/80
See application file for complete search history.

(56) References Cited

U.S. PATENT DOCUMENTS 9,322,201 B1 *  4/2016  Cheng ................ G07C 9/00571
9,382,739 B1 *  7/2016  Johnson .................. E05B 49/00
(Continued)

FOREIGN PATENT DOCUMENTS

CN    102346543 B    11/2014
EP    2 945 137 A1   11/2015
(Continued)

OTHER PUBLICATIONS

Extended European Search Report dated Nov. 6, 2018, issued in European Application No. 16884014.8.
(Continued)

*Primary Examiner* — Orlando Bousono
(74) *Attorney, Agent, or Firm* — Jefferson IP Law, LLP

(57) ABSTRACT

An electronic device for controlling a lock device is provided. The electronic device includes a connection device connected to the housing and separably coupled to a body, a communication circuit for wirelessly communicating with an external lock device, a sensor for sensing a movement and/or a rotation of the electronic device, a processor electrically connected to the communication circuit and the sensor, and a memory electrically connected to the processor. The processor is configured to sense a first signal from the external lock device the sensing of the first signal indicates that the electronic device exists within a selected distance from the external lock device, transmit a second signal to the external lock device, determine a movement of the electronic device by using the sensor in response to the
(Continued)

first signal, and transmit a third signal to the external lock device.

15 Claims, 22 Drawing Sheets

(51) Int. Cl.
*H04W 88/02* (2009.01)
*E05B 47/00* (2006.01)
*E05B 81/76* (2014.01)

(52) U.S. Cl.
CPC ........ *G07C 9/00571* (2013.01); *H04W 12/06* (2013.01); *H04W 88/02* (2013.01); *E05B 2047/0084* (2013.01); *E05B 2047/0094* (2013.01); *G07C 2009/00769* (2013.01); *G07C 2209/63* (2013.01)

(56) References Cited

U.S. PATENT DOCUMENTS

| | | | |
|---|---|---|---|
| 9,470,017 B1* | 10/2016 | Cheng | G07C 9/00571 |
| 9,470,018 B1* | 10/2016 | Cheng | G07C 9/00571 |
| 9,528,296 B1* | 12/2016 | Cheng | G07C 9/00571 |
| 9,534,420 B1* | 1/2017 | Cheng | G07C 9/00571 |
| 9,624,695 B1* | 4/2017 | Cheng | G07C 9/00571 |
| 9,644,398 B1* | 5/2017 | Cheng | G07C 9/00571 |
| 9,644,400 B1* | 5/2017 | Cheng | E05C 1/004 |
| 9,683,392 B1* | 6/2017 | Cheng | G07C 9/00571 |
| 2009/0121833 A1 | 5/2009 | Falck et al. | |
| 2011/0276609 A1* | 11/2011 | Denison | G07F 11/002 |
| | | | 707/812 |
| 2012/0271646 A1 | 10/2012 | Feldman et al. | |
| 2014/0265359 A1* | 9/2014 | Cheng | E05B 55/12 |
| | | | 292/144 |
| 2015/0102609 A1* | 4/2015 | Johnson | E05B 1/0007 |
| | | | 292/144 |
| 2015/0102610 A1* | 4/2015 | Johnson | G07C 9/00174 |
| | | | 292/144 |
| 2015/0102927 A1* | 4/2015 | Johnson | G08B 1/08 |
| | | | 340/539.14 |
| 2015/0109104 A1* | 4/2015 | Fadell | G08B 27/003 |
| | | | 340/5.65 |
| 2015/0116107 A1* | 4/2015 | Fadell | G08B 19/005 |
| | | | 340/501 |
| 2015/0178532 A1 | 6/2015 | Brule | |
| 2015/0269797 A1 | 9/2015 | Kauffmann et al. | |
| 2015/0371469 A1 | 12/2015 | Scalisi | |
| 2016/0032621 A1* | 2/2016 | Johnson | E05B 47/0012 |
| | | | 292/144 |
| 2016/0037306 A1* | 2/2016 | Johnson | H04W 4/80 |
| | | | 340/5.7 |
| 2016/0047145 A1* | 2/2016 | Johnson | E05B 47/0012 |
| | | | 292/144 |
| 2016/0049024 A1* | 2/2016 | Johnson | H04W 4/029 |
| | | | 340/5.7 |
| 2016/0049025 A1* | 2/2016 | Johnson | H04W 4/029 |
| | | | 340/5.61 |
| 2016/0049026 A1* | 2/2016 | Johnson | H04W 4/029 |
| | | | 340/5.61 |
| 2016/0050515 A1* | 2/2016 | Johnson | H04W 4/029 |
| | | | 455/41.2 |
| 2016/0187995 A1* | 6/2016 | Rosewall | H04W 12/06 |
| | | | 345/156 |
| 2016/0284181 A1* | 9/2016 | Johnson | H04W 4/029 |
| 2016/0343188 A1* | 11/2016 | Johnson | H04W 4/029 |
| 2016/0358433 A1* | 12/2016 | Johnson | G06K 9/00255 |
| 2016/0358437 A1* | 12/2016 | Johnson | G08B 13/19695 |
| 2016/0364109 A1* | 12/2016 | Yim | H04W 12/08 |
| 2017/0011570 A1* | 1/2017 | Johnson | G07C 9/00 |
| 2017/0109952 A1* | 4/2017 | Johnson | G07C 9/00309 |

FOREIGN PATENT DOCUMENTS

| | | |
|---|---|---|
| FR | 2 953 782 A1 | 6/2011 |
| GB | 2517039 A | 2/2015 |
| GB | 201309747 | 2/2015 |
| KR | 10-2013-0068538 A | 6/2013 |
| KR | 10-2014-0115631 A | 10/2014 |
| KR | 10-2015-0056702 A | 5/2015 |
| KR | 10-1521437 B1 | 5/2015 |

OTHER PUBLICATIONS

Chinese Office Action with English translation dated Dec. 18, 2019; Chinese Appln. No. 201680078072.5.

* cited by examiner

METHOD FOR LOCK DEVICE CONTROL AND ELECTRONIC DEVICE THEREOF

CROSS-REFERENCE TO RELATED APPLICATION(S)

This application is a U.S. National Stage application under 35 U.S.C. § 371 of an International application number PCT/KR2016/014854, filed on Dec. 19, 2016, which is based on and claimed priority of a Korean patent application number 10-2016-0000970, filed on Jan. 5, 2016, in the Korean Intellectual Property Office, the disclosure of which is incorporated by reference herein in its entirety.

BACKGROUND

1. Field

The disclosure relates to a method for unlocking a lock device, and an electronic device thereof.

2. Description of Related Art

Electronic devices may employ a method for authenticating a key in a short-range noncontact manner using short-range wireless communication in order to unlock another device (for example, a door lock). For example, according to a method, an electronic device may be functionally connected to a smart door, and may unlock the smart door when a user presses a button or uses another input tool through a User Interface (UI) for unlocking. Further, there may be a method for unlocking a door when an electronic device is merely connected to a smart door.

In the foregoing methods, the smart door may be required to support short-range wireless communication, a user may need to open a door in a similar manner to a method using a card key, or a door may be unlocked in advance before a user actually reaches the door (for example, the user is located within a certain distance from the door), causing security problems.

The above information is presented as background information only to assist with an understanding of the disclosure. No determination has been made, and no assertion is made, as to whether any of the above might be applicable as prior art with regard to the disclosure.

SUMMARY

When a smart door is unlocked using short-range wireless communication, a user needs to bring an electronic device into contact with the smart door in the same manner as a method of opening a door using a card key in order to unlock the door. Here, when the smart door or the electronic device does not support short-range wireless communication, it may be impossible to unlock the door. When the smart door is unlocked by the electronic device merely being connected to the smart door, the door may be unlocked in advance before the user of the electronic device actually reaches the door, causing security problems. Aspects of the disclosure are to address at least the above-mentioned problems and/or disadvantages and to provide at least the advantages described below. Accordingly, an aspect of the disclosure is to provide a method in which an electronic device provides a UI for unlocking to a user and the user performs particular input. In this method, however, the user also needs to inconveniently perform particular input to the electronic device.

According to various embodiments of the disclosure, the foregoing processes for unlocking an electronic device may be omitted.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a connection device connected to the housing and separably coupled to a body, a communication circuit configured to wirelessly communicate with an external lock device, a sensor for sensing a movement and/or a rotation of the electronic device, at least one processor electrically connected to the communication circuit and the sensor, and a memory electrically connected to the processor, wherein the memory may store commands that, when executed, enable the at least one processor to sense a first signal from an external lock device, transmit a second signal to the external lock device, determine a motion of the electronic device using the sensor in response to the first signal, and transmit a third signal to the external lock device.

In accordance with an aspect of the disclosure, an electronic device is provided. The electronic device includes a door lock having a handle or a grip, and at least one processor electrically connected to the door lock, wherein the at least one processor may include a communication circuit for performing wireless communication with an external electronic device, a sensor for sensing a motion and/or a rotation of the handle or the grip, and a control circuit electrically connected to the communication circuit and the sensor, and the control circuit may be configured to provide a first signal to the external electronic device, receive a second signal from the external electronic device, determine the motion or the rotation of the handle and/or the grip using the sensor in response to the first signal, and determine whether to unlock the door lock on the basis of at least some of the second signal and the determined motion or rotation of the handle or the grip.

In accordance with an aspect of the disclosure, a method for an electronic device is provided. The method includes sensing a first signal from an external lock device, transmitting a second signal to the external lock device, determining a motion of the electronic device using a sensor in response to the first signal, and transmitting a third signal to the external lock device.

In accordance with an aspect of the disclosure, a method for an electronic device, which includes a handle or a grip and a door lock, is provided. Various embodiments of the disclosure may include the operations of transmitting a first signal to an external electronic device, receiving a second signal from the external electronic device, determining a motion or a rotation of the handle or the grip using a sensor in response to the first signal, and determining whether to unlock the door lock on the basis of at least some of the second signal, the determined motion of the handle or the grip, and the rotation of the handle or the grip.

According to an embodiment of the disclosure, it is possible to unlock a lock device by a safe method without an additional operation for unlocking.

According to various embodiments of the disclosure, it is possible to unlock a lock device without having a physical key.

According to various embodiments of the disclosure, it is possible to unlock a lock device without inputting a password to the lock device.

According to various embodiments of the disclosure, it is possible for only a user having a registered electronic device to unlock an allowed place.

According to various embodiments of the disclosure, it is possible to manage the record of a user that achieves unlocking through an authentication key of an electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
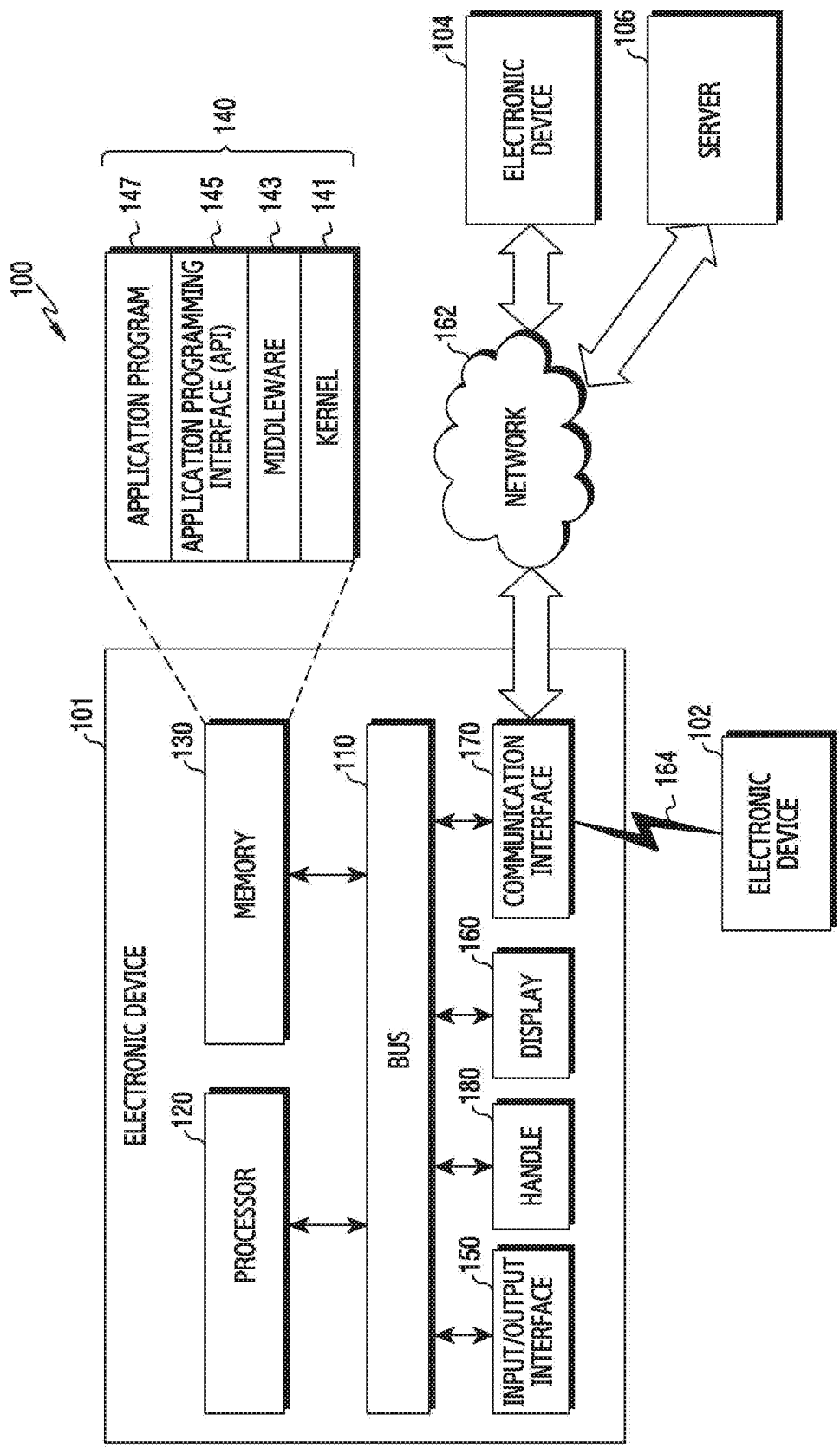
FIG. 1 illustrates a network environment including an electronic device according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "have", "may have", "include" or "may include" or the like used in the present document is intended to indicate a presence of a corresponding characteristic (e.g., a number, a function, an operation, or a constitutional element such as a component), and should be understood that there are additional possibilities of one or more other characteristics.

In the present document, an expression "A or B", "A and/or B", or "one or more of A and/or B" or the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Expressions such as "1st", "2nd", "first", and "second" may be used in various embodiments to express various constitutional elements irrespective of an order and/or an importance, and it is not intended to limit the corresponding constitutional elements. The above expressions may be used to distinguish one constitutional element from another constitutional element. For example, a 1st user device and a 2nd user device are both user devices, and indicate different user devices. For example, a 1st constitutional element may be termed a 2nd constitutional element, and similarly, the 2nd constitutional element may be termed the 1st constitutional element without departing from the scope of the disclosure.

When a certain constitutional element (e.g., the 1st constitutional element) is mentioned as being "operatively or communicatively coupled with/to" or "connected to" a different constitutional element (e.g., the 2nd constitutional element), it is to be understood that the certain constitutional element is directly coupled with/to another constitutional element or can be coupled with/to the different constitutional element via another constitutional element (e.g., a 3rd constitutional element). On the other hand, when the certain constitutional element (e.g., the 1st constitutional element) is mentioned as being "directly coupled with/to" or "directly connected to" the different constitutional element (e.g., the 2nd constitutional element), it may be understood that another constitutional element (e.g., the 3rd constitutional element) is not present between the certain constitutional element and the different constitutional element.

An expression "configured to" used in the present document may be interchangeably used with, for example, "suitable for", "having the capacity to", "designed to", "adapted to", "made to", or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

Terms used in the present document are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the present document. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present document should not be interpreted to exclude the embodiments of the present document.

According to various embodiments of the disclosure, an electronic device may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device (e.g., a smart watch, smart glasses), electronic clothes, an electronic bracelet, an electronic necklace, an electronic appcessory, an electronic tattoo, a smart mirror, or a smart watch).

According to some embodiments, the electronic device may be a smart home appliance. The smart home appliance may include, for example, at least one of a Television (TV), a Digital Video Disc (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, and an electronic picture frame.

According to other embodiments, the electronic device may include at least one of various medical devices (e.g., various portable medical measuring devices (e.g., a blood sugar measuring device, a hear rate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Navigation Satellite System (GNSS), an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.).

According to some embodiments, the electronic device may include at least one of furniture or a part of buildings/constructions, an electronic board, an electronic signature input device, a projector, and various measurement machines (e.g., water supply, electricity, gas, propagation measurement machine, etc.). In various embodiments, the electronic device may be one or more combinations of the aforementioned various devices. According to some embodiments, the electronic device may be a flexible device. Further, the electronic device according to an embodiment of the disclosure is not limited to the aforementioned devices, and may include a new electronic device depending on technical progress.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an electronic device according to various example embodiments of the disclosure.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, a communication interface (e.g., including communication circuitry) 170 and a handle 180. According to an example embodiment of the disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101. In particular, according to an embodiment of the disclosure, the processor 120 may receive first proximity service data and may perform control to receive second proximity service data using guide information necessary to receive the second proximity service data included in the first proximity service data. Alternatively, the processor 120 may perform control to transmit the first proximity service data including the guide information to receive the second proximity service data.

The memory 130 may include a volatile memory and/or a non-volatile memory. The memory 130 may store, for example, commands or data relevant to at least one other component of the electronic device 101. According to an embodiment of the disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The memory 130 may include a computer readable recording medium having a program recorded thereon to execute the method according to various example embodiments in the processor 120.

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various input/output circuitry and function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The communication interface 170 may be connected to the external electronic device 103 via short-range communication 164.

The handle 180 may serve to report an operation to the processor 120, for example, when the electronic device 101 is a lock device. The handle 180 may be provided as a physical form outside the electronic device 101. The handle 180 may include a lever and a grip-type handle.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. The network 162 may include at least one of a telecommunication network such as a computer network (e.g., a local area network (LAN) or a wireless area network (WAN)), the Internet, and a telephone network.

Each of the first and second external electronic devices 102 and 104 may be of a type identical to or different from that of the electronic device 101. According to an embodiment of the disclosure, the server 106 may include a group of one or more servers. According to various example embodiments of the disclosure, all or some of the operations performed in the electronic device 101 may be executed in another electronic device or a plurality of electronic devices (e.g., the electronic devices 102 and 104 or the server 106). According to an embodiment of the disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
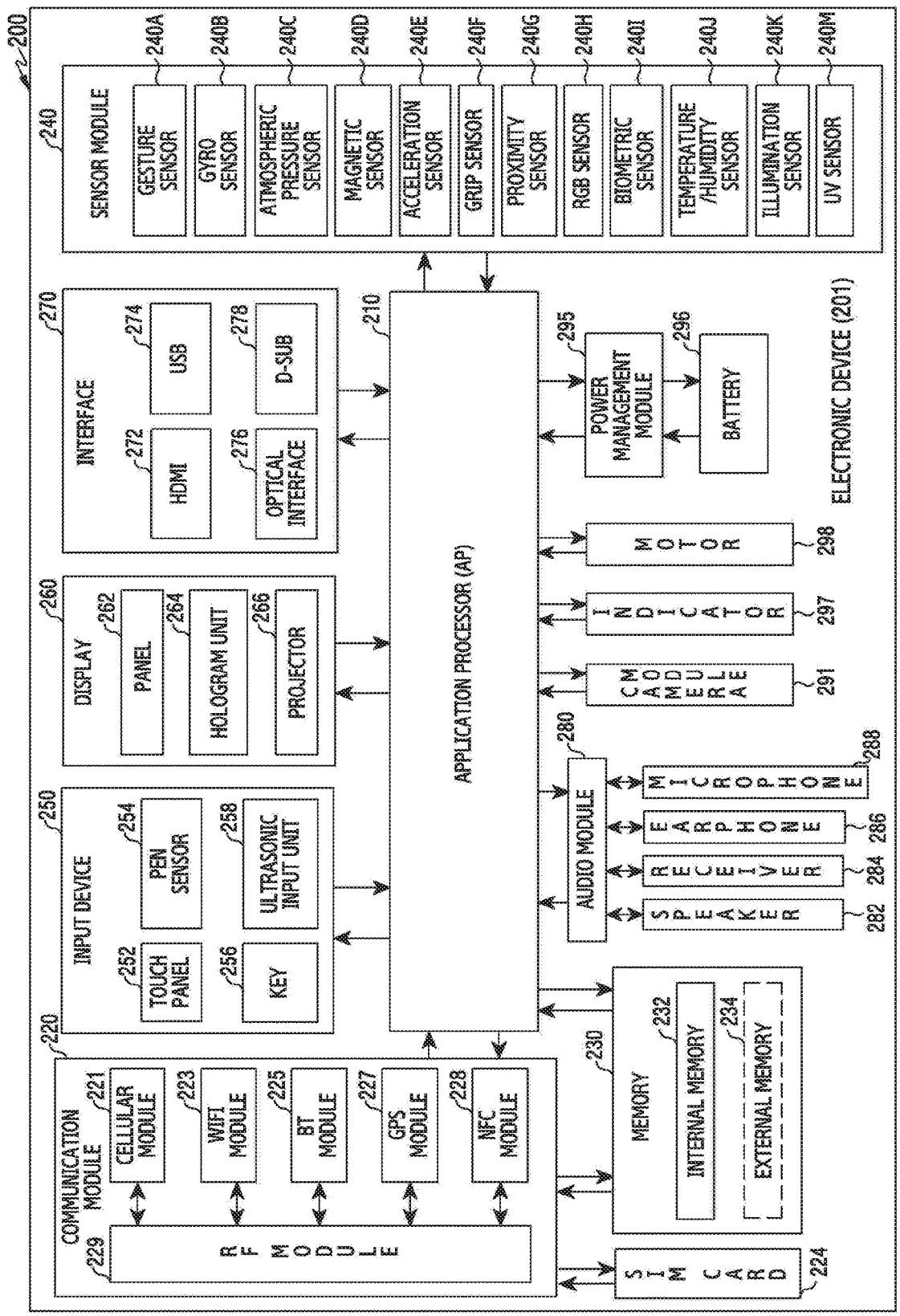
FIG. 2 is a block diagram illustrating an electronic device according to various embodiments of the disclosure.

FIG. 2 is a block diagram 200 illustrating an example electronic device according to various example embodiments of the disclosure.

The electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298.

The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), a near field communication (NFC) module 228, and a Radio Frequency (RF) module 229.

The cellular module 221, for example, may provide a voice call, a video call, a text message service, or an Internet service through a communication network. According to an embodiment of the disclosure, the cellular module 221 may distinguish and authenticate the electronic device 201 in a communication network using the subscriber identification module 224 (for example, the SIM card). According to an embodiment of the disclosure, the cellular module 221 may perform at least some of the functions that the AP 210 may provide. According to an embodiment of the disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the disclosure, the electronic device 201 may further include a processor configured to control the sensor module 240, as a part of the processor 210 or separately from the processor 210, and may control the sensor module 240 while the processor 210 is in a sleep state. In another embodiment, the electronic device 201 may include a proximity sensor. For example, when the lock device is a pull type, the sensor module 240 may sense a pull using the proximity sensor.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 may include various circuitry including, for example, and without limitation, a camera, a device which may photograph a still image and a video, or the like. According to an embodiment of the disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
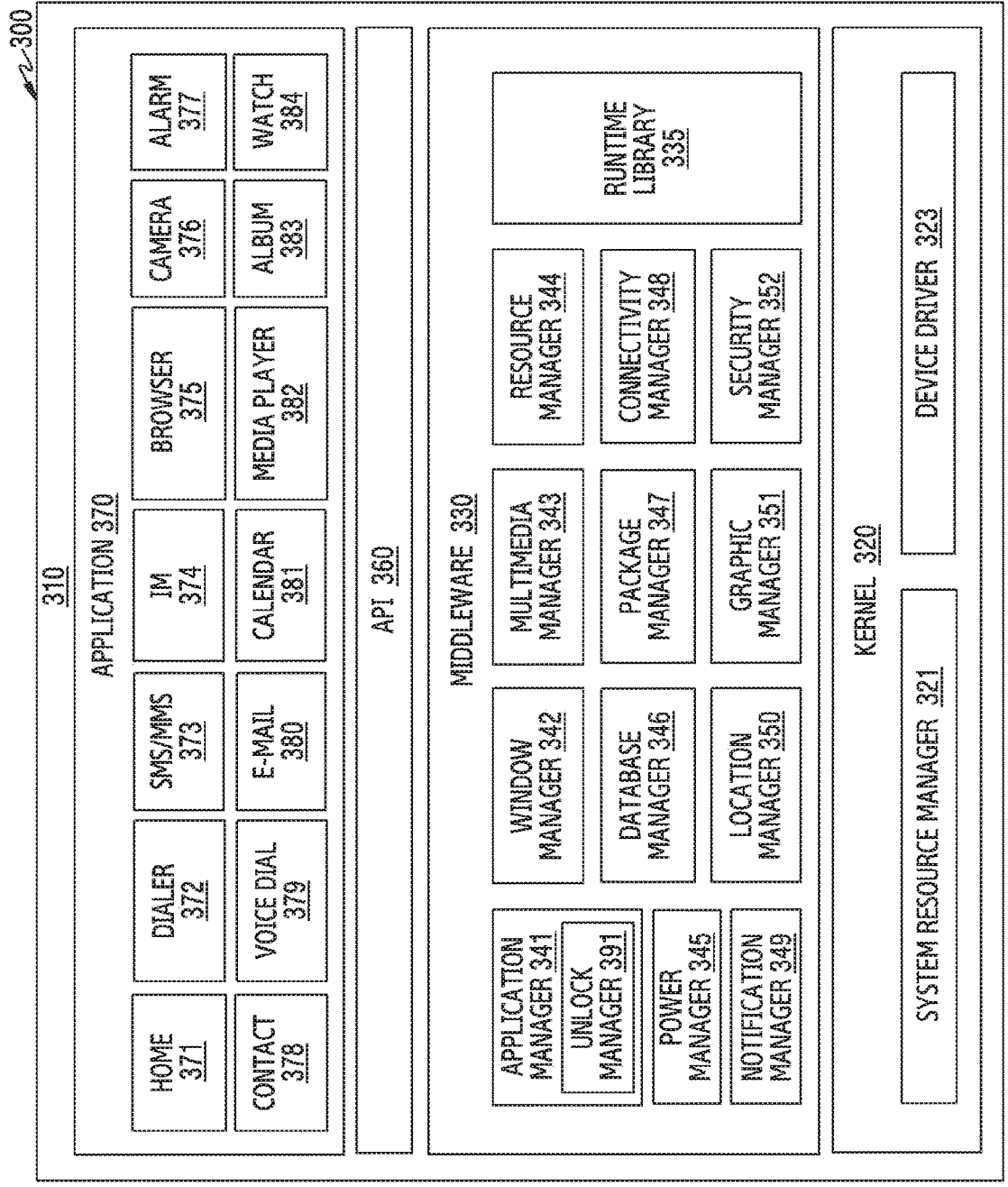
FIG. 3 is a block diagram illustrating a program module according to various embodiments of the disclosure.

FIG. 3 is a block diagram 300 illustrating an example program module according to various example embodiments of the disclosure.

According to an embodiment of the disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an example embodiment of the disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352. The application manager 341 may include an unlock manager 391.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 (e.g., the application programs 147) may include, for example, one or more applications which may provide functions such as a home 371, a dialer 372, an short message service (SMS)/multimedia messaging service (MMS) 373, an Instant Message (IM) 374, a browser 375, a camera 376, an alarm 377, a contact 378, a voice dial 379, an email 380, a calendar 381, a media player 382, an album 383, a watch 384. According to various example embodiments, the application 370 may include an application for providing a health care (e.g., for measuring exercise quantity or blood sugar, etc.), or environment information (e.g., providing atmospheric pressure, humidity, or temperature information).

According to an example embodiment of the disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user. The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an example embodiment of the disclosure, the applications 370 may include applications (e.g., a health care application of a mobile medical appliance or the like) designated according to an external electronic device (e.g., attributes of the electronic device 102 or 104). According to an embodiment of the disclosure, the applications 370 may include an application received from an external electronic device (e.g., the server 106, or the electronic device 102 or 104). According to an embodiment of the disclosure, the applications 370 may include a preloaded application or a third party application that may be downloaded from a server. The names of the components of the program module 310 of the illustrated embodiment of the disclosure may change according to the type of operating system.

According to various example embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

Any of the modules or programming modules according to various example embodiments of the disclosure may include at least one of the above described elements, exclude some of the elements, or further include other additional elements. The operations performed by the modules, programming module, or other elements according to various embodiments of the disclosure may be executed in a sequential, parallel, repetitive, or heuristic manner. Further, some operations may be executed according to another order or may be omitted, or other operations may be added.

Figure 4:
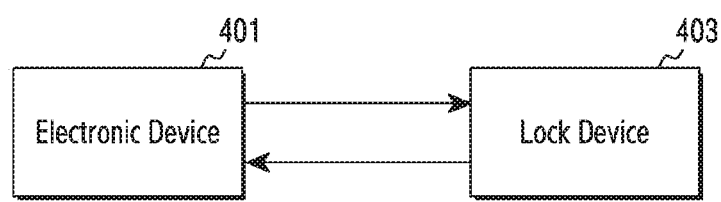
FIG. 4 is a conceptual diagram illustrating a method for controlling a lock device according to an embodiment of the disclosure.

FIG. 4 illustrates the exchange of information between an electronic device and a lock device to unlock the lock device according to an embodiment of the disclosure.

FIG. 4 is a conceptual diagram illustrating a method for controlling a lock device according to an embodiment of the disclosure.

According to an embodiment of the disclosure, the electronic device 401 may be a part or the entirety of the electronic device 101 of FIG. 1. Further, according to an embodiment of the disclosure, the lock device 403 may be a part or the entirety of the electronic device of FIG. 1. According to an embodiment of the disclosure, the electronic device 401 may include a wearable device, a mobile phone, and an electronic accessory connected to an electronic device. The wearable electronic device may be configured as various wearable types (for example, a watch type, a glasses type, an accessory type, a shirt type, a shoes type, or the like). When the wearable type is a body-attached type (for example, a shirt type), the wearable electronic device may distinguish the posture of a user's body. When the wearable electronic device is a type of being attached to an area around the ears (for example, a glasses type) or an ear-attached type (for example, an ear jack), the wearable electronic device may distinguish the posture of a user's head. When the wearable electronic device is a wrist-attached type (for example, a watch type), the wearable electronic device may distinguish the posture and motion of a user's wrist. When the wearable type is an accessory type, a band type, or a ring type, the wearable electronic device may distinguish the motion and posture of a part on which the electronic device is worn. According to one embodiment, the wearable electronic device may distinguish not only the wearable type but also the degree of a motion of a user's body part in a plurality of levels from low to high levels.

The lock device 403 may include a lock device capable of communication that includes at least one of a smart door, an electronic door, an electronic lock, and an automotive door.

According to various embodiments of the disclosure, the electronic device 401 may communicate with the lock device 403. For example, the lock device 403 may transmit a first signal for requesting a communication link to the electronic device 401. The electronic device 401 may receive the first signal transmitted from the lock device 403. The first signal may be an advertisement signal that the lock device 403 transmits to the electronic device 401 to request a communication link. Alternatively, the first signal may be a scanning signal that the lock device 403 transmits to the electronic device 401 to retrieve the lock device 403.

In one embodiment, the electronic device 401 may transmit a second signal to the lock device 403 in response to the first signal. The second signal may include a scanning signal or an advertisement signal transmitted from the electronic device 401.

According to various embodiments, the electronic device 401 and the lock device 403 may perform Bluetooth Low Energy (BLE) communication for automatic connection of two types of devices. For example, when the lock device 403 is not affected by power, the lock device 403 may transmit a scanning signal. When the lock device 403 transmits a scanning signal, the electronic device 401 may transmit an advertisement signal. According to another embodiment, the lock device 403 may transmit an advertisement signal, and the electronic device 401 may transmit a scanning signal.

In one embodiment, after transmitting the second signal to the lock device 403, the electronic device 401 may transmit a third signal to the lock device 403. In one embodiment, the third signal may include authentication information for unlocking the lock device 403 transmitted from the electronic device 401. According to another embodiment, the lock device 403 may unlock the lock device 403 using the third signal received from the electronic device 401.

According to various embodiments, when the electronic device 401 performs connection for communication with the lock device 403, the lock device 403 may transmit a scanning signal to the electronic device 401. When the lock device 403 transmits a scanning signal to the electronic device 401, the lock device 403 may increase a scanning period to be longer than a designated period for battery optimization, or may set the scanning period to be a multiple of a current period when battery status is reduced to a designated level or less. According to another embodiment, when the battery status is the designated level or less, the lock device 403 may stop scanning and may change a mode so that the lock device 403 is unlocked only by manual input. In another example, when the lock device 403 is set to be unlocked by manual input, an indication for battery replacement may be output to a user.

Figure 5:
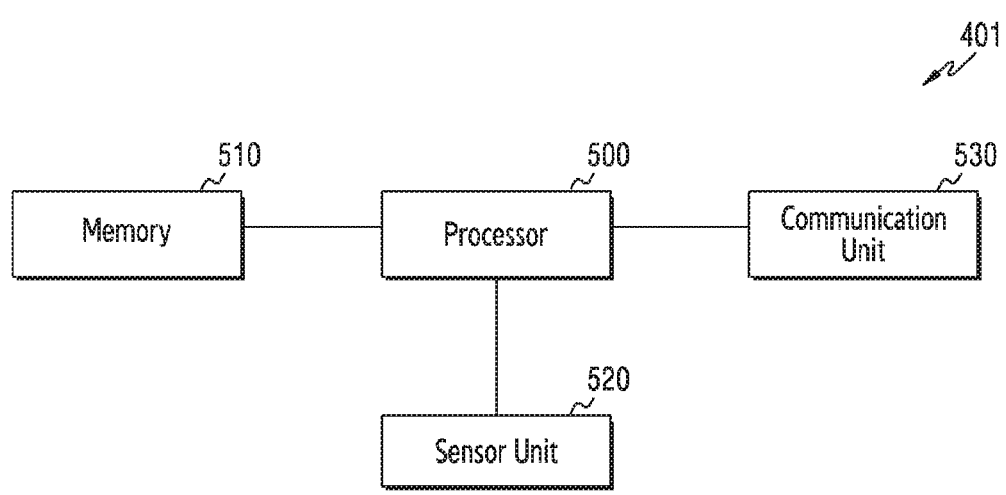
FIG. 5 illustrates an electronic device according to an embodiment of the disclosure.

FIG. 5 illustrates an electronic device according to an embodiment of the disclosure.

Referring to FIG. 5, the electronic device 401 of FIG. 4 may include a processor 500, a memory 510, a sensor unit 520, and a communication unit 530.

Referring to FIG. 5, the memory 510 may store pieces of information related to authentication information. The information related to the authentication information may include an authentication key or information on the lock device 403 of FIG. 4. In one of various embodiments, the information on the lock device 403 of FIG. 4 may include information on an object, including a lever, a handle or a grip connected to the lock device 403 of FIG. 4, for an operation performed by a user to unlock the lock device. The authentication key may be generated by encrypting a unique communication address value of the electronic device and a signature key of the lock device. A unique communication address of the electronic device may include a unique address of the electronic device, for example, a MAC address. The MAC address may include, for example, a Bluetooth address. The signature key of the lock device may be generated using an encryption algorithm, for example, AES 256. The information on the lock device 403 of FIG. 4 included in the memory 510 may include operation information, such as the type of the lever, an operation direction, and an operation angle.

The memory 510 may store values necessary for the electronic device 401 of FIG. 4 to unlock the lock device 403 of FIG. 4. For example, when the electronic device 401 of FIG. 4 senses a first signal transmitted from the lock device 403 of FIG. 4, the memory 510 may store a unique identification number of the lock device 403 of FIG. 4 to determine whether the first signal is transmitted from a registered electronic device (for example, the lock device). Further, the memory 510 may store a unique identification number included in the electronic device 401 of FIG. 4.

The processor 500 may be functionally connected to the memory 510, the sensor unit 520, and the communication unit 530. The sensor unit 520 may include a motion sensor that senses a motion. When the processor 500 detects the first signal transmitted from the lock device 403 of FIG. 4 through the communication unit 530, the processor 500 may control the communication unit 530 to transmit a second signal. After transmitting the second signal through the communication unit 530, the processor 500 may analyze output data from the sensor unit 520 and may control the electronic device 401 of FIG. 4 to transmit a third signal, which is stored in the memory 510, to the lock device 403 of FIG. 4 through the communication unit 530. For example, after receiving the first signal from the lock device 403 of FIG. 4 and transmitting the second signal to the lock device 403 of FIG. 4, when the processor 500 senses data about a motion or rotation from the sensor unit 520, the processor 500 may control the communication unit 530 to transmit the third signal, which includes authentication information and is stored in the memory 510, to the lock device 403 of FIG. 4.

According to one embodiment of the disclosure, the sensor unit 520 may include a motion sensor capable of sensing a motion of the electronic device. The sensor unit 520 may include at least one of an acceleration sensor, a gyro sensor, and a geomagnetic sensor. The output data from the sensor unit 520 may be used as data for determining a condition for transmitting the third signal. A motion of the electronic device recognized by the motion sensor may include a motion of turning a lever, a motion of moving the lever up or down, a motion of pushing the lever sideways, a motion of pulling the lever forward or pushing the level backward, and the like.

According to another embodiment of the disclosure, when the sensor unit 520 senses that the electronic device 401 of FIG. 4 is located within a designated distance from the lock device 403 of FIG. 4, the communication unit 530 may transmit, to the lock device 403 of FIG. 4, a control signal enabling the handle of the lock device 403 of FIG. 4 to be rotated, pulled, or pushed.

Figure 6:
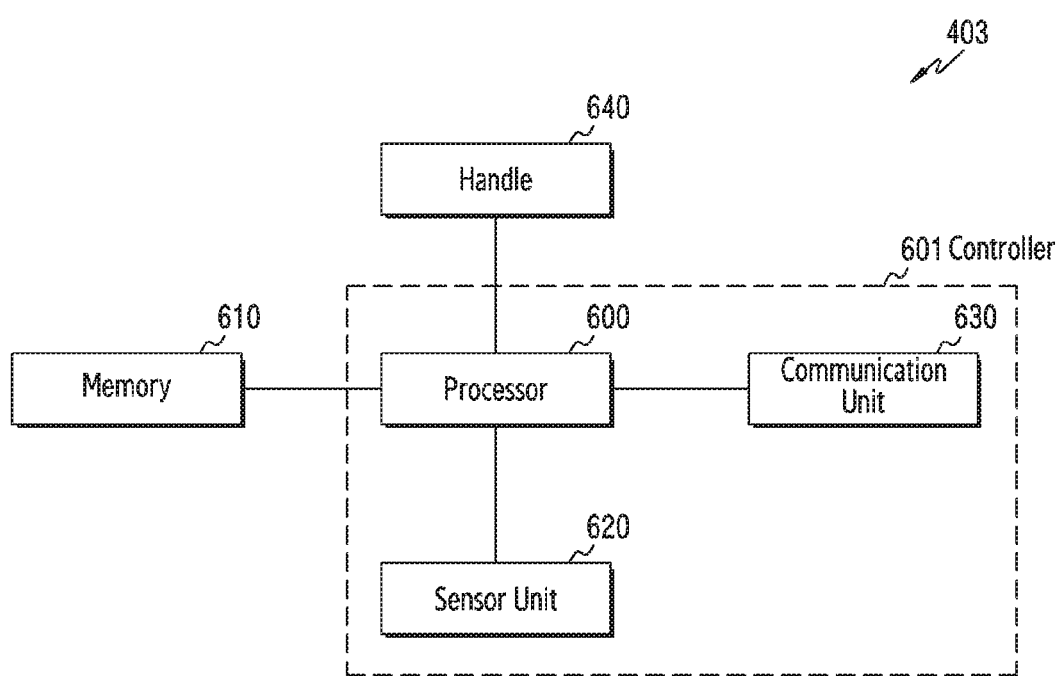
FIG. 6 illustrates a lock device according to an embodiment of the disclosure.

FIG. 6 illustrates a lock device according to an embodiment of the disclosure.

Referring to FIG. 6, the lock device 403 of FIG. 4 may include a controller 601, a memory 610, and a handle 640. Particularly, the controller 601 may include a processor 600, a sensor unit 620, and a communication unit 630.

Referring to FIG. 6, the memory 610 may store pieces of information on a registered electronic device. The memory 610 may store a unique communication address value of the electronic device so that the processor 600 may identify the electronic device 401 of FIG. 4. The memory 610 may also receive and store authentication information from the electronic device 401 of FIG. 4. Information related to the authentication information may include an authentication key. The authentication key may be generated by a server by encrypting the unique communication address value of the electronic device and a signature key of the lock device. A unique communication address of the electronic device may include a unique address of the electronic device, for example, a MAC address. The MAC address may include a Bluetooth address. The signature key of the lock device may be generated using an encryption algorithm, for example, AES 256. According to one embodiment, the memory 610 may include information on a lever. The information on the lever included in the memory 610 may include operation information, such as the type of the lever, an operation direction, and an operation angle.

The controller 601 may be functionally connected to the memory 610 and the handle 640. In particular, the controller 601 according to the embodiment of the disclosure may include the processor 600, the communication unit 630, and the sensor unit 620. The processor 600 may be functionally connected to the memory 610, the sensor unit 620, the communication unit 630, and the handle 640. The processor 600 according to an embodiment of the disclosure may include a control circuit. The processor 600 may control the communication unit 630 to transmit a first signal to the electronic device 401 of FIG. 4 and may control the communication unit 630 to receive a second signal. In another embodiment, after receiving the second signal, the processor 600 may analyze output data from the sensor unit 620 and may control the lock device 403 of FIG. 4 to receive a third signal via the communication unit 630. For example, after transmitting the first signal to the electronic device 401 of FIG. 4 and receiving the second signal from the electronic device 401 of FIG. 4, when the processor 600 senses data about a motion or rotation from the sensor unit 620, the processor 600 may control the communication unit 630 to receive the third signal from the electronic device 401 in FIG. 4.

The sensor unit 620 may include a sensor capable of sensing a motion of the lock device 403 of FIG. 4. The sensor unit 620 may include at least one of an acceleration sensor, a gyro sensor, and a geomagnetic sensor. The output data from the sensor unit 620 may be used as data for determining a condition for receiving the third signal. A motion of the electronic device recognized by a motion sensor may include a motion of turning a lever, a motion of pushing the level up or down, a motion of pushing the lever sideways, a motion of pulling the lever forward or pushing the level backward, and the like.

The handle 640 may be a physical device for a lock function. In particular, the handle 640 may perform a function of keeping the lock device 403 of FIG. 4 locked. The handle 640 may unlock or lock the lock device through a signal transmitted from the processor 600. The handle 640 may be installed in a building including an ordinary door or a window, or in a door of a vehicle, such as a car.

According to another embodiment of the disclosure, when the sensor unit 620 senses that the electronic device 401 of FIG. 4 is located within a designated distance, the controller 601 may control the handle 640 to control a motion, such as a rotation, a pull, and a push.

An electronic device according to various embodiments of the disclosure may include a housing; a connection device configured to be connected to the housing and to be separably coupled to a body; a communication circuit configured to wirelessly communicate with an external lock device; a sensor configured to sense a movement and/or a rotation of the electronic device; a processor configured to be electrically connected to the communication circuit and the sensor; and a memory configured to be electrically connected to the processor, wherein the memory may store commands that, when executed, enable the processor to: sense a first signal from an external lock device, sensing of the first signal indicating that the electronic device is located within a selected distance from the external lock device; transmit a second signal to the external lock device, the second signal indicating that the electronic device is located within a selected distance from the external lock device; determine a motion of the electronic device using the sensor in response to the first signal; and transmit a third signal to the external lock device, the second signal including motion information on the electronic device.

According to various embodiments, the third signal the electronic device of the disclosure may include authentication information for unlocking the external lock device.

According to various embodiments, the first signal and the second signal of the electronic device of the disclosure may include at least one of an advertisement signal and a scanning signal.

According to various embodiments, the motion of the electronic device of the disclosure may be determined according to an operation type of a handle or a grip of the external lock device.

According to various embodiments, the third signal of the electronic device of the disclosure may be transmitted when the motion of the electronic device corresponds to the operation type of the handle or the grip of the external lock device.

An electronic device according to various embodiments of the disclosure may include: a door lock configured to include a handle or a grip; and a controller configured to be electrically connected to the door lock, wherein the controller may include a communication unit configured to perform wireless communication with an external electronic device, a sensor configured to sense a motion and/or a rotation of the handle or the grip, and a control circuit configured to be electrically connected to the communication circuit and the sensor, and the control circuit may: provide a first signal to the external electronic device, sensing of the first signal by the external electronic device indicating that the external electronic device is located at a selected distance from the door lock; receive a second signal from the external electronic device, the second signal indicating that the external electronic device is located within a selected distance from the door lock; determine the motion or the rotation of the handle and/or the grip using the sensor in response to the first signal; and determine whether to unlock the door lock on the basis of at least some of the second signal and the determined motion and/or rotation of the handle or the grip. According to various embodiments, the second signal of the electronic device of the disclosure may include authentication information for unlocking the door lock.

According to various embodiments, the first signal and the second signal of the electronic device of the disclosure may include at least one of an advertisement signal and a scanning signal.

According to various embodiments, the control circuit of the electronic device of the disclosure may unlock the door lock when the second signal is received between a time when the motion or the rotation of the handle or the grip is sensed first and a time when the motion or the rotation is terminated.

According to various embodiments, the control circuit of the electronic device of the disclosure may transmit information on the handle or the grip to the external electronic device.

Figure 7:
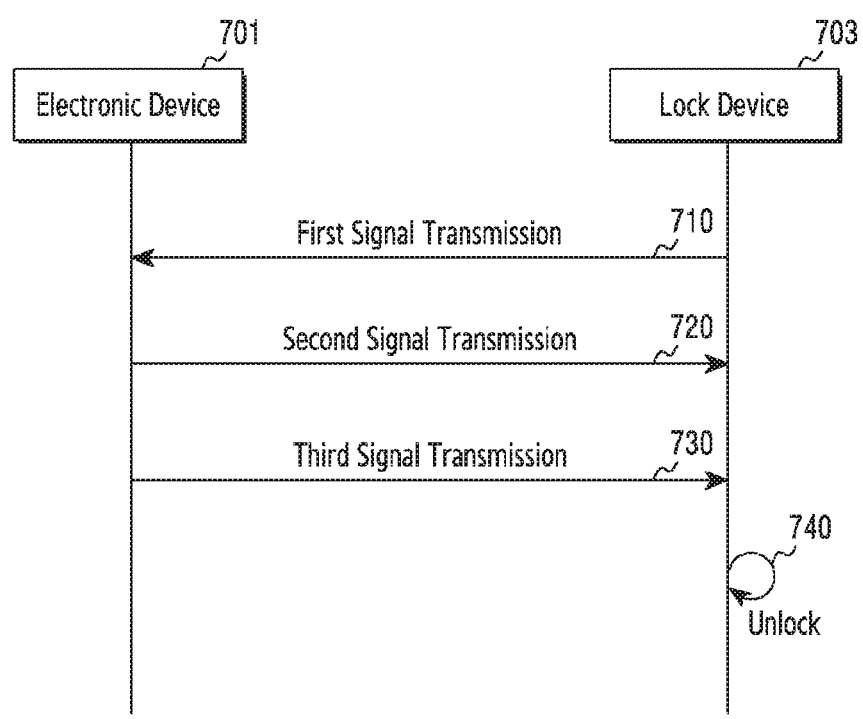
FIG. 7 illustrates a procedure for exchanging signals between an electronic device and a lock device according to various embodiments of the disclosure.

FIG. 7 illustrates a procedure for exchanging signals between an electronic device and a lock device according to various embodiments of the disclosure.

Referring to FIG. 7, the electronic device 701 (for example, the processor 500 of FIG. 5) may transmit/receive a signal to/from a lock device 703 (for example, the processor 600 of FIG. 6). According to one embodiment of the disclosure, the electronic device 701 may be similar to the electronic device 401 of FIG. 4, or may be a part or the entirety of the electronic device 401 of FIG. 4. According to one embodiment of the disclosure, the lock device 703 may be similar to the lock device 403 of FIG. 4, or may be a part or the entirety of the lock device 403 of FIG. 4.

In operation 710, the lock device 703 may transmit a first signal for connecting the electronic device 701 to the electronic device 701. The first signal transmitted by the lock device 703 may include an advertisement signal that the lock device 703 continuously transmits. In another embodiment, the first signal may include a scanning signal for the lock device 703 to periodically find the electronic device 701.

When the lock device 703 transmits the first signal and the electronic device 701 senses the first signal, the electronic device 701 may check whether the first signal is transmitted from a registered device. When the first signal is a signal received from a registered device, the electronic device 701 may transmit a second signal to the lock device 703 in response to the first signal in operation 720. In another embodiment, the electronic device 701 may transmit the second signal to the lock device 703 regardless of whether the electronic device 701 receives the first signal. In still another embodiment, the electronic device 701 may randomly transmit the second signal without specifying a transmission destination.

When communication of the first signal and the second signal is achieved between the electronic device 701 and the lock device 703 and it is identified that the first signal and the second signal are respectively transmitted and received from a registered device, the electronic device 701 and the lock device 703 may enter a standby mode to transmit or receive a third signal. When both the electronic device 701 and the lock device 703 are in a standby mode state, if the electronic device 701 senses the operation of the electronic device 701 according to one embodiment, the electronic device 701 may transmit the third signal to the lock device 703. According to one embodiment, when the lock device 703 receives the third signal from the electronic device 701 (e.g., as in operation 730 illustrated in FIG. 7) and the lock device 703 is in an authentication wait state, the lock device 703 may unlock the lock device 703 in operation 740. The authentication wait state may be a state from the time when the lock device 703 first senses the operation of the lock device 703 to the time when the lock device 703 completes sensing the operation of the lock device 703. During the authentication wait state, the lock device 703 may determine whether the third signal is transmitted from the electronic device 701. According to one embodiment, when the lock device 703 normally receives the third signal from the electronic device 701 in the authentication wait state, the lock device 703 may unlock the handle 640 of the lock device 703, thereby unlocking the lock device 703.

Figure 8:
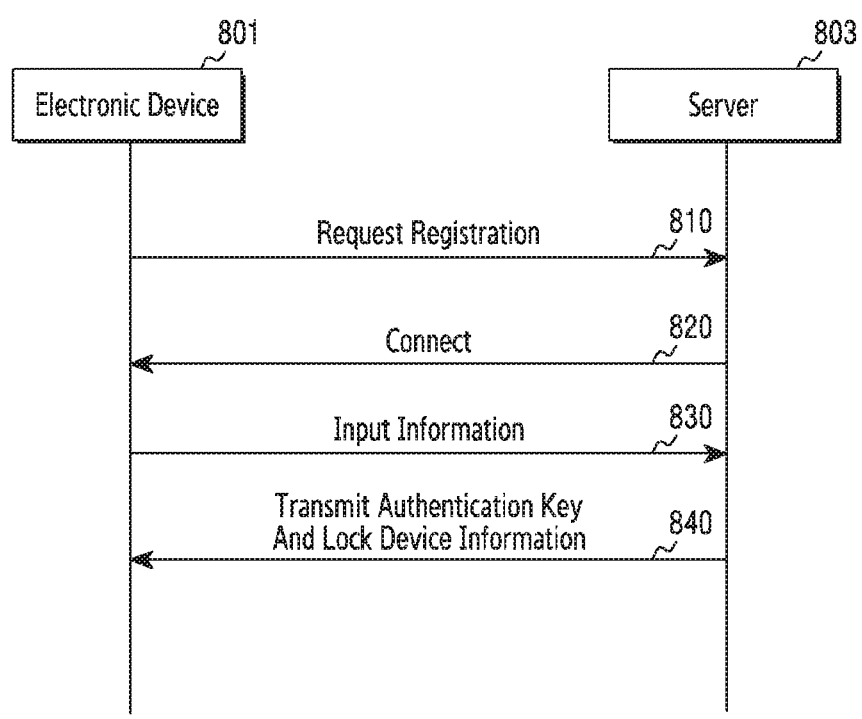
FIG. 8 illustrates a procedure for registering and issuing authentication information between an electronic device and a lock device according to various embodiments of the disclosure.

FIG. 8 illustrates a procedure for registering and issuing authentication information between an electronic device and a lock device according to various embodiments of the disclosure.

According to one embodiment of the disclosure, the electronic device 801 may be a part or the entirety of the electronic device 401 of FIG. 4. According to one embodiment of the disclosure, a server 803 may be present separately from the lock device 403 of FIG. 4 and may communicate with the lock device 403 of FIG. 4, or may be included in the lock device 403 of FIG. 4.

Referring to FIG. 8, in operation 810, the electronic device 801 may make a registration request to the server 803. The server 803 may be a system for managing one or more lock devices 703 of FIG. 7. For example, the server 803 may be a smart key system, a system for managing a smart home, or a system for managing a hotel or a building. Although not shown, the server 803 may include an administrator program for managing the lock device 703 of FIG. 7. In another embodiment, the server 803 may be included in the lock device 703 of FIG. 7. The administrator program is a user interface (UI) configuration and may include a communication unit that manages connection with the lock device 703, a list management unit that manages a list of the electronic device 801 paired with the lock device 703, and an information management unit that manages information on the connected electronic device 801.

According to one embodiment, when the server 803 receives the registration request from the electronic device 801 in operation 810, the server 803 may perform connection for communication with the electronic device 801 in operation 820. The electronic device 801 may communicate with the server 803 via wireless communication methods, including Bluetooth, Bluetooth Low Energy (BLE), ZigBee, Wi-Fi, RF communication, or cellular communication, and/or wired communication methods.

When the server 803 and the electronic device 801 are connected, the server 803 may transmit a UI for managing information to the electronic device 801. Upon receiving the UI from the server 803, the user of the electronic device 801 may input information to the electronic device 801 or a terminal of the server 803 in operation 830. For example, the electronic device 801 may input information through the UI provided from the server 803, and the input information may be retransmitted to the server 803. The electronic device 801 may be assigned designated authority from the server 803 via a registration process in which the electronic device 801 inputs the information to the server 803. The information that the electronic device 801 provides to the server 803 may include a MAC address and a Bluetooth identifier (BT ID). The user of the electronic device 801 or the administrator of the server 803 may access the server 803 and may register user information and information on the electronic device 801. When the user or the administrator registers the user information, the user information may include emergency password information. The user may input the emergency password information, so that the user can unlock the lock device 703 of FIG. 7 without using the electronic device 801.

When the registration process is normally achieved by inputting the information on the electronic device 801 and the user information to the server 803 in operation 830, the server 803 may transmit an authentication key and lock device information to the electronic device 801 in operation 840. According to the embodiment of the disclosure, the lock device information may include information on a lever. The server 803 may generate the authentication key by applying an encryption algorithm (for example, AES 256) to a unique identification number (for example, including a MAC address, in which the MAC address may include a Bluetooth address) of the electronic device 801 and a signature key of the lock device 703 of FIG. 7. The lock device information may include information on the form of the lever. The form of the lever may include a rotational form, a pushing form, a pulling form, a move-up form, or a move-down form. Further, the lock device information may include a sensor recognition algorithm value depending on the type of the lever. The lock device information provided by the server 803 may include information on the lever and information on an operation type of the very lever. For example, the server 803 may provide information on a particular lever product by a particular company, may provide information on a lever of a type moving in a particular direction, or may provide only information simply on the type of an operation. According to one embodiment, the lock device information may be transmitted not only in the registration process but also when the lock device 703 of FIG. 7 transmits a first signal to the electronic device 801. Alternatively, the lock device information may not be transmitted in the registration process but may be transmitted when the lock device 703 of FIG. 7 transmits the first signal to the electronic device 801. According to various embodiments, the administrator program may invalidate the registration of the registered electronic device 801 or may set and manage a predetermined period for the registered electronic device 801. For example, the administrator program may invalidate the registration of the registered electronic device when the predetermined period expires (for example, when the electronic device is not used over a period of one month or longer).

Figure 9:
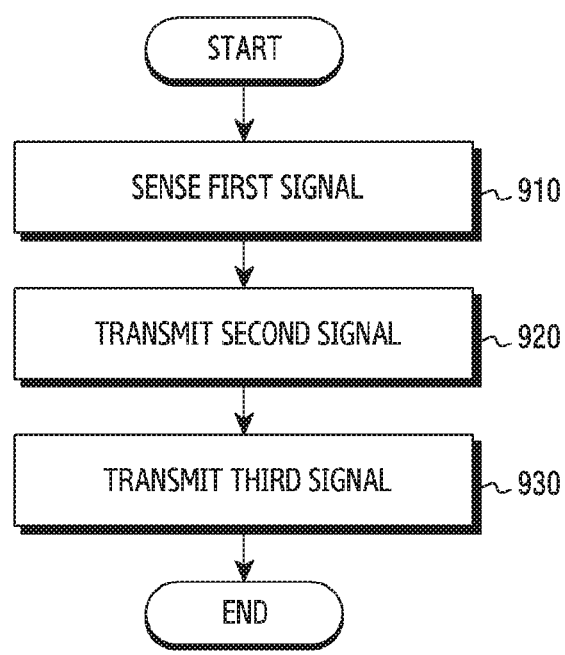
FIG. 9 illustrates a signal control procedure for an electronic device to unlock a lock device according to various embodiments of the disclosure.

FIG. 9 illustrates a signal control procedure for an electronic device to unlock a lock device according to various embodiments of the disclosure.

Referring to FIG. 9, in operation 910, the electronic device (for example, 401 in FIG. 4) may sense a first signal. The first signal may be a signal transmitted from a lock device (for example, 403 in FIG. 4). The first signal transmitted by the lock device may include an advertisement signal that the lock device continuously transmits. Alternatively, the first signal may include a scanning signal for the lock device to periodically find another designated electronic device. The electronic device may sense that the lock device is located within a designated distance by sensing the first signal. In another embodiment, the electronic device may sense that the strength of the first signal is a designated signal strength or less by sensing the first signal.

When the first signal is a signal received from a registered lock device, the electronic device may transmit a second signal to the lock device in response to the first signal in operation 920. According to various embodiments, as the electronic device transmits the second signal and the lock device receives the second signal, the lock device may identify that the electronic device is located within a designated distance. In another embodiment, as the electronic device transmits the second signal and the lock device receives the second signal, the lock device may identify that the strength of the second signal transmitted by the electronic device is a designated signal strength or less.

After transmitting the second signal, the electronic device may sense a motion of the electronic device, and may transmit a third signal to the lock device when the sensed motion corresponds to the type of a lever (e.g., as in operation 930 illustrated in FIG. 9). The third signal may be key information for authentication. Upon receiving the third signal from the electronic device, the lock device may unlock the handle 640 of the lock device when the third signal satisfies a designated condition. According to various embodiments, the third signal may include information on motion sensing of the electronic device.

Figure 10:
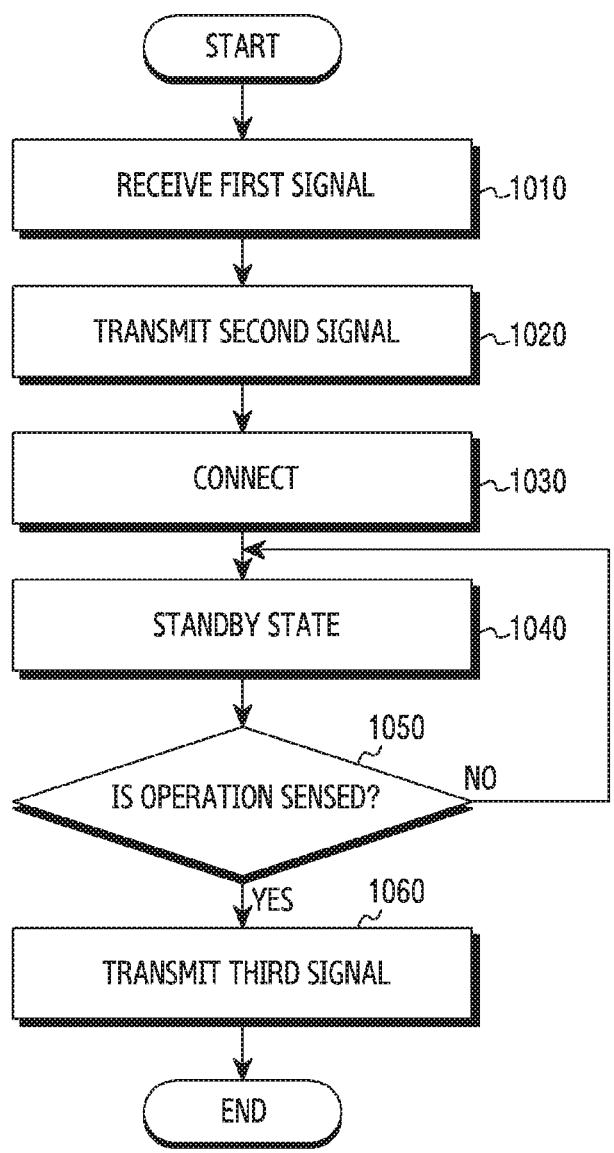
FIG. 10 illustrates an operational procedure for an electronic device to unlock a lock device according to various embodiments of the disclosure.

FIG. 10 illustrates an operational procedure for an electronic device to unlock a lock device according to various embodiments of the disclosure.

Referring to FIG. 10, in operation 1010, the electronic device (for example, 401 in FIG. 4) may receive a first signal. The first signal transmitted by the lock device (for example, 403 in FIG. 4) may include an advertisement signal that the lock device continuously transmits. In another embodiment, the first signal may include a scanning signal for the lock device to periodically find an electronic device. The electronic device may sense that the lock device is located within a designated distance by sensing the first signal. In another embodiment, the electronic device may sense that the strength of the first signal is a designated signal strength or less by sensing the first signal.

When the electronic device senses the first signal from the lock device, the electronic device may check whether the first signal is transmitted from a registered device. When the first signal is a signal received from a registered device, the electronic device may transmit a second signal to the lock device in response to the first signal in operation 1020. According to various embodiments, as the electronic device transmits the second signal and the lock device receives the second signal, the lock device may identify that the electronic device is located within a designated distance. In another embodiment, as the electronic device transmits the second signal and the lock device receives the second signal, the lock device may identify that the strength of the second signal transmitted by the electronic device is a designated signal strength or less.

After the electronic device transmits the second signal to the lock device, the electronic device may connect communication with the lock device in operation 1020. After identifying the connection for communication with the lock device, the electronic device may enter a standby mode state in operation 1040. The standby mode state may refer to a state in which communication between the electronic device and the lock device is connected. In the standby mode state, the electronic device may identify the type of a lever of the stored lock device. In the standby mode state, the electronic device may identify whether information identified from the sensor unit 520 is an operation corresponding to the type of the lever of the lock device. According to another embodiment of the disclosure, when an auxiliary electronic device is connected to the electronic device, the electronic device may identify whether a value received from a sensor unit of the auxiliary electronic device corresponds to the type of the lever of the lock device. Here, the sensor unit may be a motion sensor that senses a user or a motion of the electronic device transmitted through the user.

In the standby mode state, when at least some of an identified value from the sensor unit 520 of the electronic device or an identified value from the auxiliary electronic device is mapped to the type of the level of the lock device in operation 1050, the electronic device may change the mode from the standby mode state to a motion sensing state.

When identifying a motion value from the auxiliary electronic device, the auxiliary electronic device may be an electronic accessory in the form of a band or a ring. When identifying a motion value from the auxiliary electronic device, the auxiliary electronic device may be one worn on a body part that the user usually uses to open the lock device. For example, a ring or band may be worn on a hand that the user usually uses to open a door. When identifying operation information from the auxiliary electronic device, the electronic device may determine whether the operation information identified from the auxiliary electronic device is information corresponding to the type of the lever, or the electronic device may receive, from the auxiliary electronic device, information on whether the operation of the auxiliary electronic device corresponds to the type of the lever. Accordingly, the electronic device may receive the information from the auxiliary electronic device and may then transmit a third signal to the lock device. Alternatively, the auxiliary electronic device may transmit the third signal to the lock device depending on the embodiment.

When the motion sensing state mode is identified, the electronic device may transmit the third signal to the lock device in operation 1060. The third signal may be key information for authentication. Upon receiving the third signal from the electronic device, the lock device may unlock the lock device when the third signal satisfies a designated condition. According to various embodiments, the third signal may include information on motion sensing of the electronic device.

Although not shown in the drawings, according to various embodiments, when the electronic device transmits the third signal to the lock device and the lock device receives the third signal and is unlocked, the lock device may transmit unlocking information to the electronic device. Alternatively, when the lock device does not perform unlocking, the lock device may transmit corresponding information to the electronic device. According to various embodiments, the electronic device may display the unlocking information or the information indicating unlocking is not performed through a sound, a screen, or vibrations of the electronic device. For example, when the electronic device receives the unlocking information from the lock device, the electronic device may display "open" on the screen of the electronic device or may output a corresponding sound or vibration. Further, when receiving the unlocking information or the information on the failure of unlocking from the lock device, the electronic device may also change the state of the electronic device to an unlocked state or the standby mode state.

Figure 11:
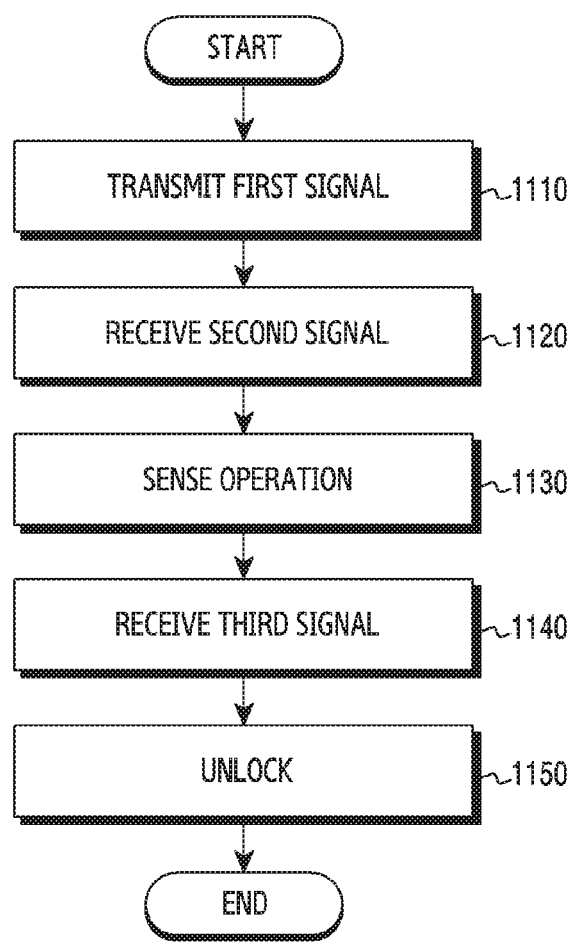
FIG. 11 illustrates a signal control procedure for unlocking by a lock device according to various embodiments of the disclosure.

FIG. 11 illustrates a signal control procedure for unlocking by a lock device according to various embodiments of the disclosure.

Referring to FIG. 11, in operation 1110, the lock device (for example, 403 in FIG. 4) may transmit a first signal. The first signal transmitted by the lock device may include an advertisement signal that the lock device continuously transmits. Alternatively, the first signal may include a scanning signal for the lock device to periodically find an electronic device (for example, 401 in FIG. 4).

In operation 1120, the lock device may receive a second signal from the electronic device. According to various embodiments, the lock device may identify that the electronic device is located within a designated distance on the basis of the second signal received from the electronic device. According to another embodiment, as the electronic device transmits the second signal and the lock device receives the second signal, the lock device may identify that the strength of the second signal transmitted by the electronic device is a designated signal strength or less. When transmission and reception of the first signal and the second signal between the lock device and the electronic device are achieved, communication between the lock device and the electronic device may be connected. When the communication is established, the lock device may change a current state to a motion sensing standby mode state.

In operation 1130, the lock device may sense a motion of the lock device. For example, the lock device may sense a motion of a lever of the lock device. When the lock device senses a motion, the lock device may change the current state to an authentication standby mode state. The authentication standby mode state may be a step for receiving authentication information from the electronic device. The authentication standby mode state may be maintained from the time when a motion of the lever is sensed first to the time when the motion of the lever is no longer sensed. Alternatively, the authentication standby mode state may be maintained from the time when a motion of the lever is sensed first to the time when the lever is moved to touch a contact point of a switch inside the lock device is touched.

In operation 1140, the lock device may receive a third signal from the electronic device. The third signal may be key information for authentication. According to various embodiments, the third signal may include information on motion sensing of the electronic device.

In operation 1150, when the lock device receives the third signal from the electronic device in the authentication standby mode state, the lock device may unlock the lock device when the third signal satisfies a designated condition.

Figure 12:
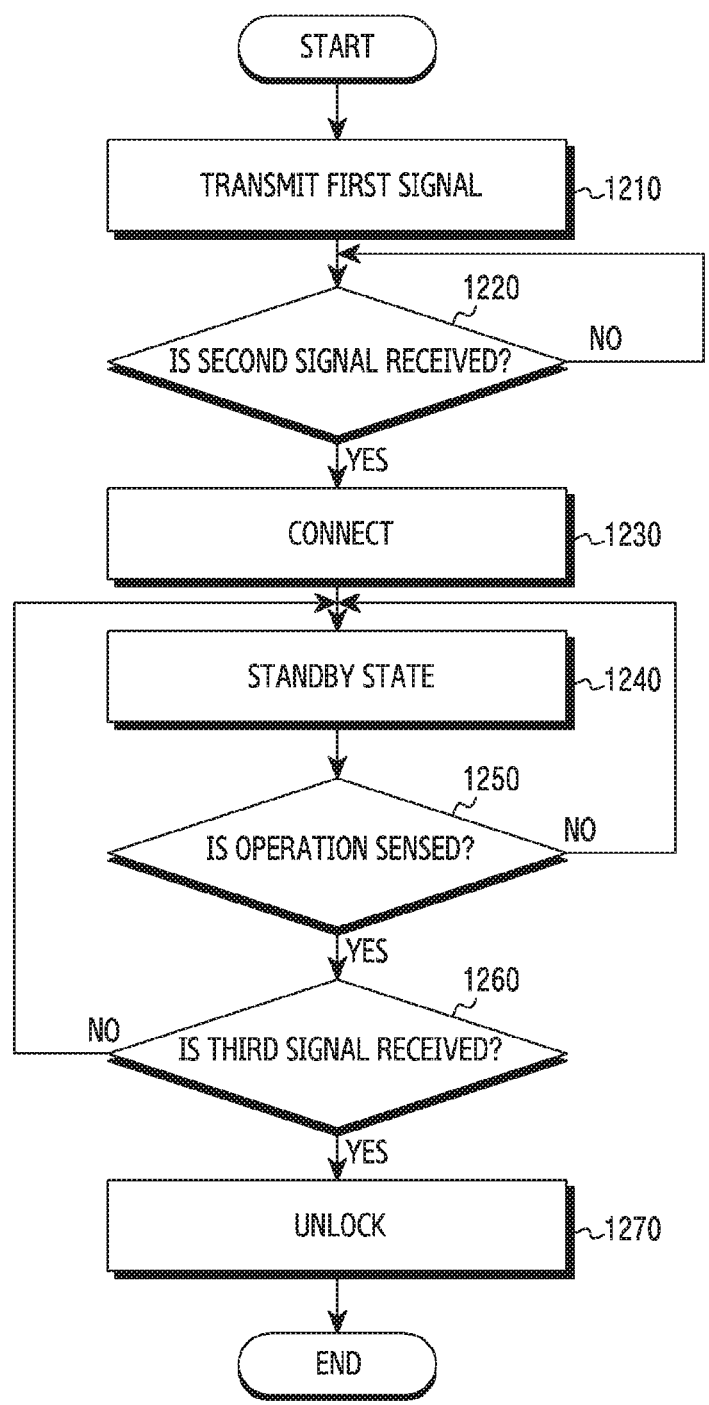
FIG. 12 illustrates a procedure for unlocking by a lock device according to various embodiments of the disclosure.

FIG. 12 illustrates a procedure for unlocking by a lock device according to various embodiments of the disclosure.

Referring to FIG. 12, in operation 1210, an electronic device (for example, 401 in FIG. 4) may transmit a first signal. The first signal transmitted by the lock device (for example, 403 in FIG. 4) may include an advertisement signal that the lock device continuously transmits. Alternatively, the first signal may include a scanning signal for the lock device to periodically find an electronic device. The electronic device may sense that the lock device is located within a designated distance by sensing the first signal. Alternatively, the electronic device may sense that the strength of the first signal is a designated signal strength or less by sensing the first signal.

In operation 1220, the lock device may determine whether a second signal is received. According to various embodiments, as the electronic device transmits the second signal and the lock device receives the second signal, the lock device may identify that the electronic device is located within a designated distance. In another embodiment, as the electronic device transmits the second signal and the lock device receives the second signal, the lock device may identify that the strength of the second signal transmitted by the electronic device is a designated signal strength or less.

When the lock device receives the second signal, the electronic device may connect communication with the lock device in operation 1230. After the lock device identifies the connection for communication with the electronic device, the lock device may enter a standby mode state for motion sensing in operation 1240. The standby mode state for motion sensing may refer to a state in which communication between the electronic device and the lock device is connected.

In operation 1250, the lock device may determine whether a motion of the lock device is sensed. In the standby mode state for motion sensing, the lock device may sense a motion of the lock device. For example, the lock device may sense a motion of a lever of the lock device. When the lock device senses a motion, the lock device may change the current state to the authentication standby mode state. The authentication standby mode state may be a step for receiving authentication information from the electronic device. The authentication standby mode state may be maintained from the time when a motion of the lever is sensed first to the time when the motion of the lever is no longer sensed. Alternatively, the authentication standby mode state may be maintained from the time when a motion of the lever is sensed first to the time when the lever is moved to touch a contact point of a switch inside the lock device is touched.

In operation 1260, the lock device may determine whether the lock device receives a third signal in the authentication standby mode state. The third signal may be key information for authentication. According to various embodiments, the third signal may include information on motion sensing of the electronic device.

When it is determined that the lock device receives the third signal from the electronic device in operation 1260, the lock device may determine whether the received third signal satisfies a designated condition in operation 1270. The designated condition may include a condition on whether information received from the third signal matches authentication information, a condition on whether a signal received from the third signal is received in the authentication standby mode state, and a condition on whether the authentication information has expired. When the third signal satisfies the designated condition, the lock device may unlock a door lock of the lock device. When the third signal does not satisfy the designated condition, the lock device may set the current state to the standby state illustrated in operation 1240 or may set the current state to an initial state.

Figure 13:
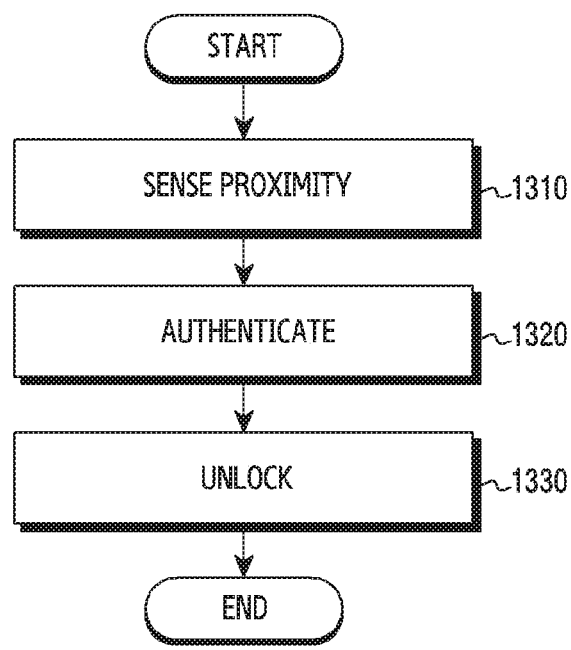
FIG. 13 illustrates an operational procedure for a lock device according to various embodiments of the disclosure.

FIG. 13 illustrates an operational procedure for a lock device according to various embodiments of the disclosure.

Referring to FIG. 13, in operation 1310, the lock device (for example, 403 in FIG. 4) may sense that an electronic device (for example, 401 in FIG. 4) is in proximity. The lock device may transmit a signal to the electronic device to sense that the electronic device is in proximity. According to an embodiment of the disclosure, when the lock device is connected to a power source at all times, the lock device may periodically and continuously transmit a signal to surrounding electronic devices. According to another embodiment, when the lock device is not connected to a power source at all times, the lock device may sense a touch of the lock device by the user. Alternatively, when a motion is sensed in a sensor unit of the electronic device through the electronic device that is connected to the lock device and has a designated level of power or higher, the lock device receives a signal from the electronic device and may perform an activation mode whenever the signal is received, thereby continuously and periodically transmitting the signal to another electronic device. Operation 1310 may include a start operation for starting information exchange between the lock device and the electronic device.

In operation 1320, the lock device may exchange authentication information with the electronic device. The lock device may exchange the authentication information according to the rotation angle in operation 1320. Operation 1320 may include a standby mode operation for exchanging authentication information.

In operation 1330, the lock device may perform unlocking. The lock device may unlock the lock device when receiving the authentication information from the electronic device in operation 1320. Operation 1330 may include an implement operation for unlocking.

Figure 14:
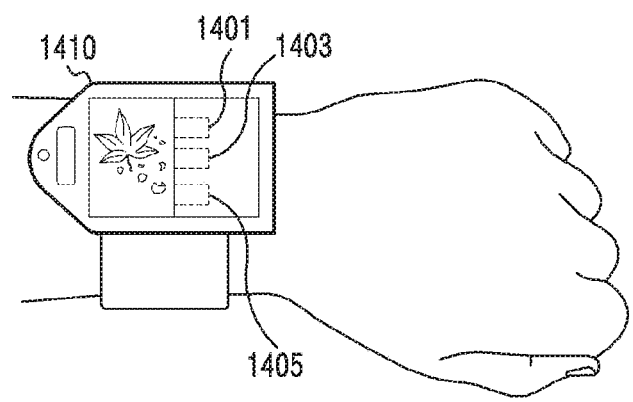
FIG. 14 illustrates an example of an electronic device according to various embodiments of the disclosure.

FIG. 14 illustrates an example of an electronic device according to various embodiments of the disclosure.

According to one embodiment of the disclosure, the electronic device 1410 may be a part or the entirety of the electronic device 401 of FIG. 4. FIG. 14 shows an example in which the electronic device 1410 is a watch type among wearable devices. The electronic device 1410 of FIG. 14 may also be a watch-type electronic device for unlocking the lock device 403 of FIG. 4 including a smart door. When the electronic device 1410 is provided as a watch type, the electronic device 1410 may be worn on the user's wrist. When worn on the wrist, the electronic device 1410 can distinguish the posture and motion of the user's wrist. When the electronic device 1410 is provided as a watch type for unlocking the lock device 403 of FIG. 4, the electronic device 1410 may include a sensor unit 1401, a smart key data management unit 1403, and an authentication key storage unit 1405.

The sensor unit 1401 may sense a motion of the wrist in the standby mode state in which communication between the electronic device 1410 and the lock device 403 of FIG. 4 is connected. The sensor unit 1401 of FIG. 14 may correspond to the sensor unit 520 of FIG. 5.

The smart key data management unit 1403 may compare a motion sensed by the sensor unit 1401 with information on the lever according to the form of the lock device 403 of FIG. 4, and may obtain an authentication key from the authentication key storage unit 1405 and may transmit the authentication key to the lock device 403 of FIG. 4 when the type of the motion matches the information on the lever.

The information on the lever according to the form of the lock device 403 of FIG. 4 may include a predetermined rotation angle and predetermined moving distance information according to the type of the lever. The information on the lever according to the form of the lock device 403 of FIG. 4 may be transmitted from the lock device 403 of FIG. 4 to the electronic device 1410 in a pairing state in which communication between the electronic device 1410 and the lock device 403 of FIG. 4 is connected or in a connection process.

Figure 15A:
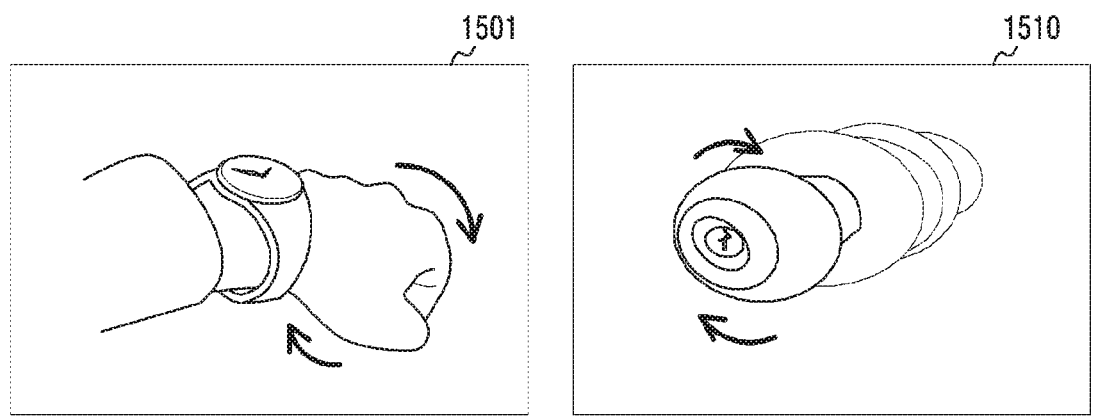
FIGS. 15A, 15B and 15C illustrate examples of a motion for unlocking with an electronic device worn according to various embodiments of the disclosure.
Figure 15B:
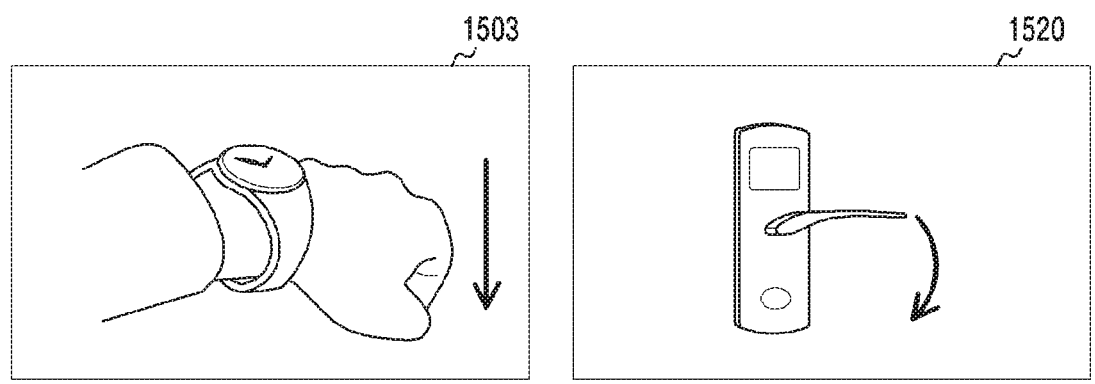
Figure 15C:
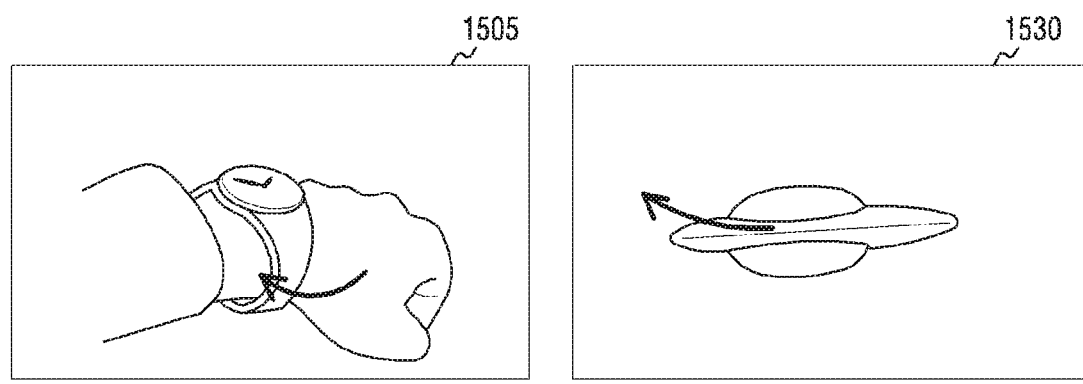

FIGS. 15A, 15B and 15C illustrate examples of a motion for unlocking with an electronic device worn according to various embodiments of the disclosure.

Operations shown in 1501, 1503, and 1505 of FIGS. 15A, 15B and 15C may correspond to an operation in which the electronic device 401 in FIG. 4 senses a motion after operation 920 in FIG. 9 and operation 1040 in FIG. 10. The electronic device 401 of FIG. 4 may receive and store information on the handle of the lock device 403 of FIG. 4 in the lock device 403 of FIG. 4 in a registration process. Alternatively, when a first signal is received from the lock device 403 of FIG. 4, the electronic device 401 may store the information on the handle of the lock device 403 of FIG. 4. Further, the electronic device 401 of FIG. 4 may store in advance motion information corresponding to the information on the handle. When a sensed motion corresponds to the information on the handle, the electronic device 401 of FIG. 4 may transmit a third signal to the lock device 403 of FIG. 4.

In FIG. 15A, 1501 illustrates a motion of the electronic device 401 of FIG. 4 corresponding to a case where the form of the lock device is a handle of a rotary type. In FIG. 15A, 1501 may correspond to an operation in the case of a handle in a form illustrated in 1510 of FIG. 15A. When the lock device 403 of FIG. 5 has the form illustrated in 1510 of FIG. 15A and the electronic device senses the operation corresponding to 1501 of FIG. 15A, the electronic device 401 of FIG. 4 may transmit the third signal to the lock device 403 of FIG. 4.

In FIG. 15B, 1503 illustrates a motion of the electronic device 401 corresponding to a case where the form of the lock device is a handle of a move-down type. In FIG. 15B, 1503 may correspond to an operation in the case of a handle type illustrated in 1520 of FIG. 15B. When the lock device 403 has the form illustrated in 1520 of FIG. 15B and the electronic device senses the operation corresponding to 1503 of FIG. 15B, then the electronic device 401 may transmit the third signal to the lock device 403.

In FIG. 15C, 1505 illustrates a motion of the electronic device 401 corresponding to a case where the form of the lock device is a handle of a pull type. In FIG. 15C, 1505 may correspond to an operation in the case of a handle type illustrated in 1530 in FIG. 15C. When the lock device 403 has the form illustrated in 1530 of FIG. 15C and the electronic device senses the operation corresponding to 1505 of FIG. 15C, the electronic device 401 may transmit the third signal to the lock device 403.

Reference elements 1501, 1503, and 1505 illustrated in FIGS. 15A, 15B and 15C may be a part or the entirety of the electronic device 401 illustrated in FIG. 4. 1501, 1520, and 1530 illustrated in FIGS. 15A, 15B and 15C may be a part or the entirety of the lock device 403 illustrated in FIG. 4. The operations illustrated in 1510, 1520, and 1530 of FIGS. 15A, 15B and 15C may correspond to an operation of the lock device 403 sensing a motion in operation 1130 of FIG. 11 and operation 1250 in FIG. 12. Information on a lever may be transmitted from the server 803 to the electronic device 401 during a process in which the electronic device 401 registers information on the electronic device 401 in the server 803. Further, the information on the lever may be transmitted to the electronic device 401 via the first signal when the lock device 403 transmits the first signal.

The lock device 403 may receive the third signal for authentication from the time when the operations illustrated in 1510, 1520 and 1530 of FIG. 15A are first sensed to the time when the operations illustrated in 1510, 1520 and 1530 of FIG. 15A are terminated, and may be unlocked.

In FIG. 15A, 1510 illustrates a motion of the lock device 403 corresponding to a case where the form of the lock device is a handle of a rotary type. In FIG. 15A, 1510 may be an operation corresponding to the motion of the electronic device 401 in the form illustrated in 1501 of FIG. 15A. When the electronic device 401 senses the operation corresponding to 1501 of FIG. 15A and transmits the third signal while the lock device 403 recognizes the operation 1510 of FIG. 15A, the lock device 403 may receive the third signal and may be unlocked.

In FIG. 15B, 1520 illustrates a motion of the lock device 403 corresponding to a case where the form of the lock device is a handle of a move-down type. In FIG. 15B, 1520 may be an operation corresponding to the motion of the electronic device 401 in the form illustrated in 1503 of FIG. 15B. When the electronic device 401 senses the operation corresponding to 1503 of FIG. 15B and transmits the third signal while the lock device 403 recognizes the operation 1520 of FIG. 15B, the lock device 403 may receive the third signal and may be unlocked.

In FIG. 15C, 1505 illustrates a motion of the lock device 403 corresponding to a case where the form of the lock device is a handle of a pull type. In FIG. 15C, 1530 may be an operation corresponding to the motion of the electronic device 401 in the form illustrated in 1505 of FIG. 15C. When the electronic device 401 senses the operation corresponding to 1505 of FIG. 15C and transmits the third signal while the lock device 403 recognizes the operation 1530 of FIG. 15C, the lock device 403 may receive the third signal and may be unlocked.

Although not shown in the drawings, the operation of the electronic device 401 and the lock device 403 may include an operation of moving up the lever, an operation of pushing the lever sideways, an operation of pushing the lever back and forth, and the like.

Figure 16:
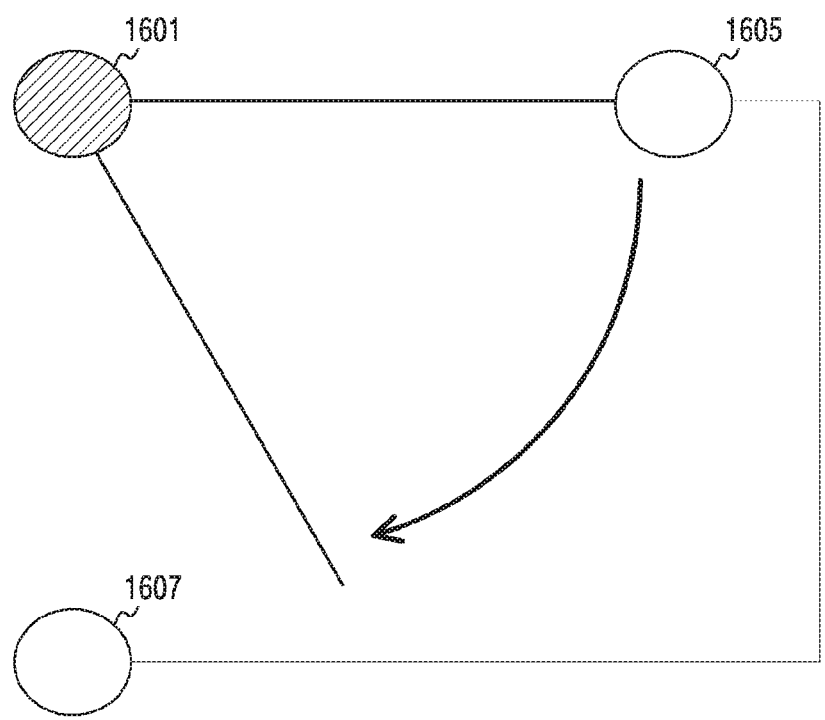
FIG. 16 illustrates an example of the physical operation of a lock device according to various embodiments of the disclosure.

FIG. 16 illustrates an example of the physical operation of a lock device according to various embodiments of the disclosure.

Referring to FIG. 16, the lock device (for example, 403 in FIG. 4) may include a shaft 1601 of a handle, a first contact point 1605, and a second contact point 1607. The handle may move about the shaft 1601 in the lock device 403. For example, the handle may normally be in contact with the first contact point 1605 with respect to the shaft 1601. When the user rotates the handle, the handle is rotated about the shaft 1601 by the angle at which the user rotates the handle and may become in contact with the second contact point 1607. An internal circuit of the lock device 403 is in contact with a particular portion through the first contact point 1605. When an external operation is exerted, the internal circuit may become disconnected from the first contact point 1605 and may become short-circuited. When the handle is turned to the end, the internal circuit of the lock device 403 may become in contact with the second contact point 1607 and may be released from the short circuit. According to an embodiment of the disclosure, the lock device may be in a state of receiving a signal for authentication (for example, operation 1320 of FIG. 13) before the time when the contact with the second contact point 1607 is achieved from the time when the contact with the first contact point 1605 is released. When the lock device does not receive authentication information until the contact with the second contact point 1607 is achieved, the lock device may enter an operation of entering a state for sensing an external electronic device (for example, operation 1310 of FIG. 1). When the lock device receives the authentication information from the electronic device before the time when the contact with the second contact point 1607 is achieved from the time when the contact with the first contact point 1605 is released, the lock device may be unlocked (for example, operation 1330 in FIG. 13).

Figure 17A:
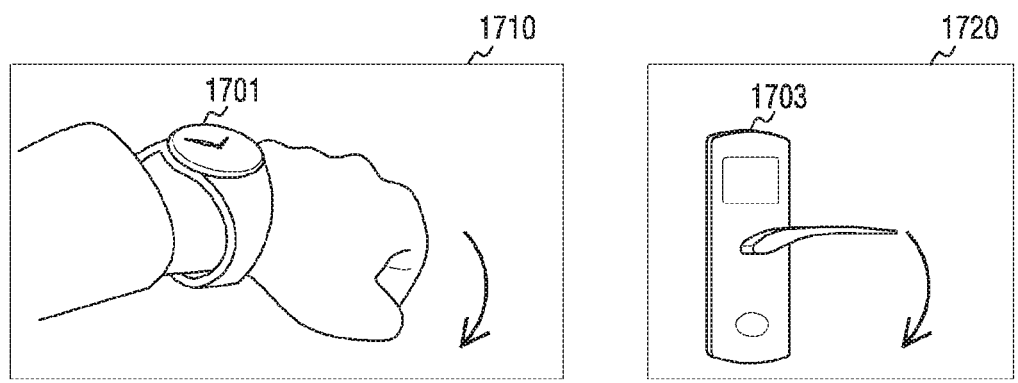
FIGS. 17A, 17B and 17C illustrate examples of a method of signal transmission and reception between an electronic device and a lock device for enhancing security according to various embodiments of the disclosure.
Figure 17B:
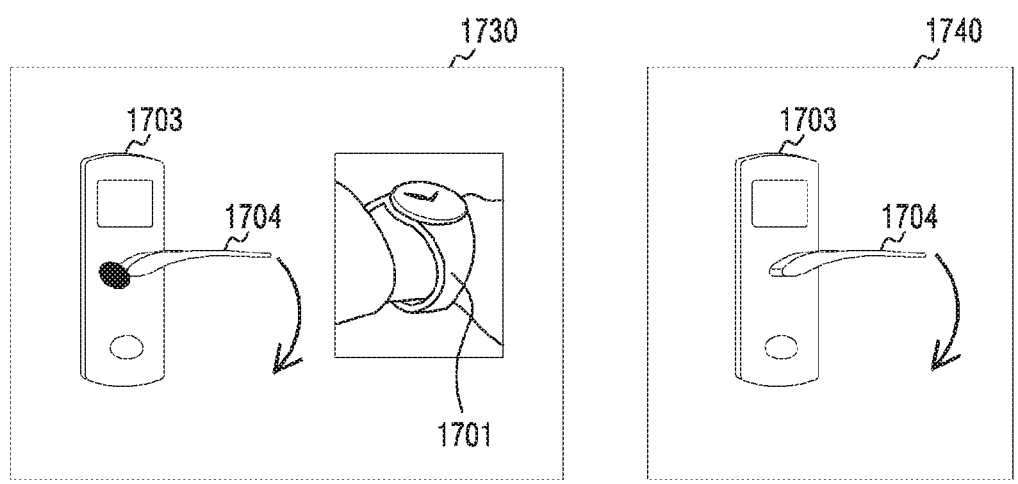
Figure 17C:
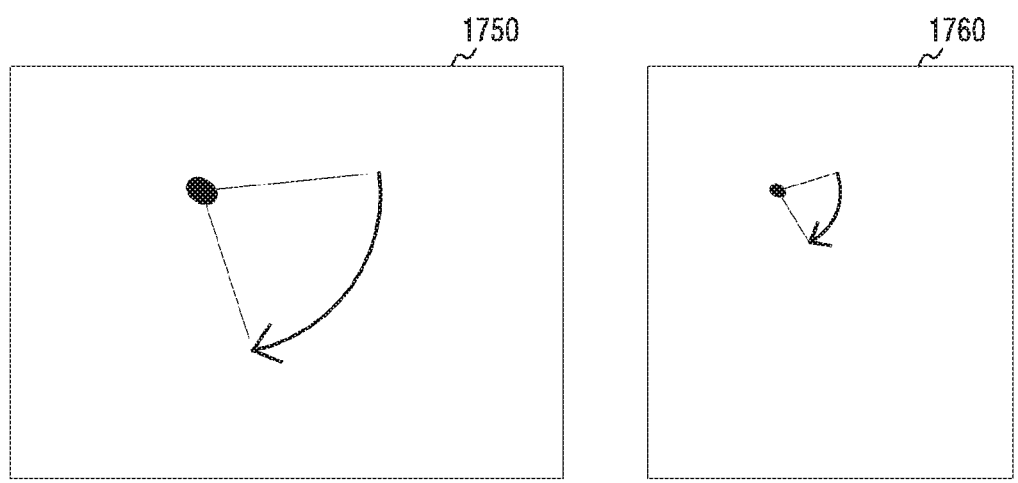

FIGS. 17A, 17B, and 17C illustrate examples of a method of signal transmission and reception between an electronic device and a lock device for enhancing security according to various embodiments of the disclosure.

According to one embodiment of the disclosure, the electronic device 1701 may be a part or the entirety of the electronic device 401 of FIG. 4. Further, the lock device 1703 may be a part or the entirety of the lock device 403 of FIG. 4. In one of various embodiments of the disclosure, the electronic device 1701 may transmit a third signal to the lock device 1703, thereby transmitting authentication information. In order to enhance security in the process where the electronic device 1701 transmits the third signal, the electronic device 1701 may transmit, to the lock device 1703, pieces of information sensed in transmission of an authentication key, for example, the rotation speed and/or moving distance information of an operation input in the electronic device. In another embodiment, when the lock device 1703 is a pull type, the electronic device 1701 may transmit, to the lock device 1703, information on a pull using a muscle sensor capable of measuring the strength of the user's muscles. Upon receiving the rotation speed and the moving distance information from the electronic device 1701, the lock device 1703 may compare the received rotation speed and moving distance information of the electronic device 1701 with the rotation speed and the moving distance of a lever, and may perform authentication when the speeds or the distances match each other with a designated range.

Referring to 1710 of FIG. 17A, the electronic device 1701 may transmit, to the lock device 1703, the rotation speed and the moving distance information at the time when the operation is sensed first. Referring to 1720 of FIG. 17A, after receiving, from the electronic device 1701, the rotation speed and the moving distance information at the time when the operation is sensed first, the lock device 1703 may compare the rotation speed and the moving distance information of the lever sensed at the time when the operation of the lever of the lock device 1703 is sensed first with the rotation speed and the moving distance information received from the electronic device, thereby identifying whether the two pieces of information match each other.

Referring to 1730 of FIG. 17B, the electronic device 1701 may transmit the rotation speed and the moving distance information, which are obtained while the operation is being sensed, to the lock device 1703. Referring to 1740 of FIG. 17B, after receiving the rotation speed and the moving distance information, which are obtained while the operation is being sensed, from the electronic device 1701, the lock device 1703 may compare the rotation speed and the moving distance information of the lever 1704 sensed while the operation of the lever 1704 of the lock device 1703 is being sensed with the rotation speed and the moving distance information received from the electronic device, thereby identifying whether the two pieces of information match each other.

Referring to 1750 of FIG. 17C, the electronic device 1701 may transmit, to the lock device 1703, the rotation speed and the moving distance information at the time when the operation is terminated. Referring to 1760 of FIG. 17C, after receiving, from the electronic device 401, the rotation speed and the moving distance information at the time when the operation is terminated, the lock device 1703 may compare the rotation speed and the moving distance information of the lever sensed at the time when the operation of the lever of the lock device 1703 is terminated with the rotation speed and the moving distance information received from the electronic device, thereby identifying whether the two pieces of information match each other.

The lock device 1703 may receive the rotation speed and the moving distance information from the electronic device 1701. When the above pieces of information match the rotation speed and the moving distance information of the lock device 1703, the lock device 1703 may determine that the operations of the electronic device 1701 and the lock device 1703 occur simultaneously and may unlock the lock device 1703.

Figure 18:
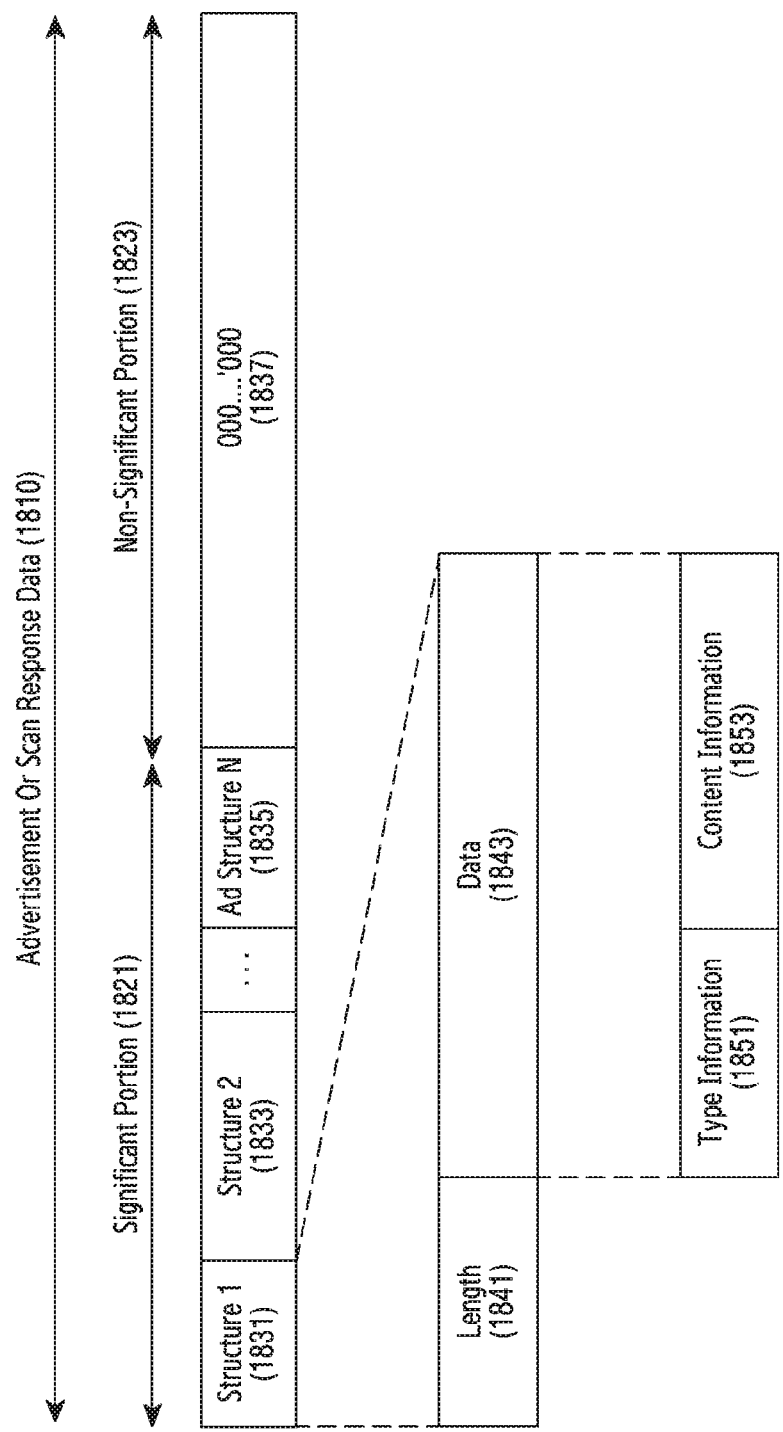
FIG. 18 illustrates an example of data transmitted for communication with a counterpart device according to various embodiments of the disclosure.

FIG. 18 illustrates an example of data transmitted for communication with a counterpart device according to various embodiments of the disclosure.

Referring to FIG. 18, an electronic device or a lock device may transmit advertisement data or scan response data 1810 to perform connection or pairing with a counterpart device.

When the electronic device or the lock device transmits the advertisement data or the scan response data 1810, the advertisement data or the scan response data 1810 may include a significant portion 1821 and a non-significant portion 1823. The advertisement data or the scan response data 1810 may be transmitted through the significant portion 1821. The non-significant portion 1823 may include null information 1837, such as "000 . . . 00". The significant portion 1821 may include N structures (AD structures) 1831, 1833, and 1835. Each structure may include information on length 1841 and information on data 1843. The information on the data 1843 may include information 1851 on the type of the advertisement data or the scan response data 1810 and information on content 1853 of the advertisement data or the scan response data 1810.

A method for an electronic device according to various embodiments of the disclosure may include: sensing a first signal from an external lock device; transmitting a second signal to the external lock device; determining a motion of the electronic device using a sensor in response to the first signal; and transmitting a third signal to the external lock device, wherein the sensing of the first signal may indicate that the electronic device is located within a selected distance from the external lock device, the second signal may indicate that the electronic device is located within a selected distance from the external lock device, the second signal may include motion information on the electronic device, and the sensor may sense a motion and/or a rotation of the electronic device.

According to various embodiments, the third signal may include authentication information for unlocking the external lock device.

According to various embodiments, the first signal and the second signal may include at least one of an advertisement signal and a scanning signal.

According to various embodiments, the motion of the electronic device may be determined according to an operation type of a handle or a grip of the external lock device.

According to various embodiments, the third signal may be transmitted when the motion of the electronic device corresponds to the operation type of the handle or the grip of the external lock device.

A method for an electronic device, which includes a handle or a grip and a door lock, according to various embodiments of the disclosure may include: transmitting a first signal to an external electronic device; receiving a second signal from the external electronic device; determining a motion or a rotation of the handle or the grip using a sensor in response to the first signal; and determining whether to unlock the door lock on the basis of at least some of the second signal and the determined motion and/or rotation of the handle or the grip, wherein the first signal may indicate that the external electronic device is located at a selected distance from the door lock, and the second signal may indicate that the external electronic device is located within a selected distance from the door lock.

According to various embodiments, the second signal may include authentication information for unlocking the door lock.

According to various embodiments, the first signal and the second signal may include at least one of an advertisement signal and a scanning signal.

According to various embodiments, the method for the electronic device may include unlocking the door lock when the second signal is received between a time when the motion or the rotation of the handle or the grip is sensed first and a time when the motion or the rotation is terminated.

According to various embodiments, the method for the electronic device may further include transmitting information on the handle or the grip to the external electronic device.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a constitutional element included in the disclosure is expressed in a singular or plural form according to the specific example embodiment proposed herein. However, the singular or plural expression is selected properly for a situation proposed for the convenience of explanation, and thus the various embodiments of the disclosure are not limited to a single or a plurality of constitutional elements. Therefore, a constitutional element expressed in a plural form can also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing;
a connection device connected to the housing and separably coupled to a body;
a communication circuit configured to wirelessly communicate with an external lock device;
a sensor for sensing a movement and/or a rotation of the electronic device;
at least one processor electrically connected to the communication circuit and the sensor; and
a memory electrically connected to the at least one processor, wherein the memory stores commands that, when executed, enable the at least one processor to:
  sense a first signal broadcast from the external lock device, the sensing of the first signal indicating to the electronic device that the electronic device is located within a selected distance from the external lock device,
  transmit a second signal to the external lock device, the second signal indicating to the external lock device that the electronic device is located within the selected distance from the external lock device,
  determine a motion of the electronic device using the sensor in response to the first signal, and
  transmit a third signal to the external lock device, the third signal comprising motion information on the electronic device.

2. The electronic device as claimed in claim 1, wherein the third signal comprises authentication information for unlocking the external lock device.

3. The electronic device as claimed in claim 1, wherein the first signal and the second signal comprise at least one of an advertisement signal or a scanning signal.

4. The electronic device as claimed in claim 1, wherein the motion of the electronic device is determined according to an operation type of a handle or a grip of the external lock device.

5. The electronic device as claimed in claim 4, wherein the third signal is transmitted when the motion of the electronic device corresponds to the operation type of the handle or the grip of the external lock device.

6. An electronic device comprising:
a door lock including a handle or a grip; and
at least one processor configured to be electrically connected to the door lock,
wherein the at least one processor comprises:
a communication circuit for performing wireless communication with an external electronic device,
a sensor for sensing a motion and/or a rotation of the handle or the grip, and
a control circuit electrically connected to the communication circuit and the sensor, and
wherein the control circuit is configured to:
broadcast a first signal to the external electronic device, a sensing of the first signal by the external electronic device indicating to the external electronic device that the external electronic device is located at a selected distance from the door lock,
receive a second signal from the external electronic device, the second signal indicating to the electronic device that the external electronic device is located within the selected distance from the door lock,
determine the motion or the rotation of the handle and/or the grip using the sensor in response to the first signal, and
determine whether to unlock the door lock based on at least the second signal and the determined motion and/or rotation of the handle or the grip.

7. The electronic device as claimed in claim 6, wherein the second signal comprises authentication information for unlocking the door lock.

8. The electronic device as claimed in claim 6, wherein the first signal and the second signal comprise at least one of an advertisement signal or a scanning signal.

9. The electronic device as claimed in claim 6, wherein the control circuit is further configured to unlock the door lock when the second signal is received between a time when the motion or the rotation of the handle or the grip is sensed first and a time when the motion or the rotation is terminated.

10. The electronic device as claimed in claim 6, wherein the control circuit is further configured to transmit information on the handle or the grip to the external electronic device.

11. A method for an electronic device, the method comprising:
sensing a first signal broadcast from an external lock device;
transmitting a second signal to the external lock device;
determining a motion of the electronic device using a sensor in response to the first signal; and
transmitting a third signal to the external lock device,
wherein the sensing of the first signal indicates to the electronic device that the electronic device is located within a selected distance from the external lock device,
wherein the second signal indicates to the external lock device that the electronic device is located within the selected distance from the external lock device,
wherein the third signal comprises motion information on the electronic device, and
wherein the sensor senses a motion and/or a rotation of the electronic device.

12. The method as claimed in claim 11, wherein the third signal comprises authentication information for unlocking the external lock device.

13. The method as claimed in claim 11, wherein the motion of the electronic device is determined according to an operation type of a handle or a grip of the external lock device.

14. A method for an electronic device, the electronic device comprising a handle or a grip and a door lock, the method comprising:
transmitting a first signal to an external electronic device;
receiving a second signal from the external electronic device;
determining a motion and/or a rotation of the handle or the grip using a sensor in response to the first signal; and
determining whether to unlock the door lock based on at least the second signal and the determined motion and/or the rotation of the handle or the grip,
wherein the first signal indicates to the external electronic device that the external electronic device is located at a selected distance from the door lock, and
wherein the second signal indicates to the electronic device that the external electronic device is located within the selected distance from the door lock.

15. The method as claimed in claim 14, wherein the second signal comprises authentication information for unlocking the door lock.

* * * * *